US008831660B2

(12) United States Patent
Jonker et al.

(10) Patent No.: US 8,831,660 B2
(45) Date of Patent: Sep. 9, 2014

(54) SYSTEM, METHOD AND APPARATUS FOR DYNAMIC WIRELESS NETWORK DISCOVERY

(75) Inventors: Niels Jonker, Reston, VA (US); James William Lake, Santa Monica, CA (US); Steve Herman Moller, Monrovia, CA (US); Eric Todd Blue, Los Angeles, CA (US); Jonathan Daniel Mendelson, San Carlos, CA (US); Kishore Raja, Culver City, CA (US)

(73) Assignee: Boingo Wireless, Inc., Los Angeles, CA (US)

( * ) Notice: Subject to any disclaimer, the term of this patent is extended or adjusted under 35 U.S.C. 154(b) by 467 days.

(21) Appl. No.: 13/346,205

(22) Filed: Jan. 9, 2012

(65) Prior Publication Data

US 2012/0178488 A1 Jul. 12, 2012

Related U.S. Application Data

(60) Provisional application No. 61/431,028, filed on Jan. 9, 2011.

(51) Int. Cl.
*H04W 4/00* (2009.01)
*H04L 12/26* (2006.01)
*H04W 36/00* (2009.01)
*H04W 8/00* (2009.01)
H04W 88/14 (2009.01)
H04W 8/22 (2009.01)
H04W 24/02 (2009.01)
H04W 48/16 (2009.01)

(52) U.S. Cl.
CPC .............. *H04W 8/005* (2013.01); *H04W 88/14* (2013.01); *H04W 8/22* (2013.01); *H04W 24/02* (2013.01); *H04W 48/16* (2013.01)

USPC .......... 455/517; 455/436; 370/338; 370/252; 370/328

(58) Field of Classification Search
USPC ................... 455/436, 517; 370/338, 252, 328
See application file for complete search history.

(56) References Cited

U.S. PATENT DOCUMENTS 8,325,626 B2 * 12/2012 Toth et al. .................... 370/254
8,498,230 B2 * 7/2013 Kasslin et al. ............... 370/311

(Continued)

OTHER PUBLICATIONS

Notification of Transmittal of the ISR and the Written Opinion of the Int'l Searching Authority dated Aug. 28, 2012, re Int'l application No. PCT/US2012/020676, 8 pages.

*Primary Examiner* — Bobbak Safaipour
(74) *Attorney, Agent, or Firm* — Greenberg Traurig, LLP; Franklin D. Ubell

(57) ABSTRACT

A dynamic wireless network discovery system, apparatus and method are provided for users of wireless device to find, connect to, and use wireless networks in an automated manner. New gained knowledge about a wireless network is shared with a central server, which in turn aggregates knowledge about wireless networks collected from various wireless devices, and takes all this aggregated knowledge and reduces the individual data points to aggregate data that provides valuable information about the status of the networks. The central server then in turn distributes this information to a software client operating on wireless devices. Dynamically learned wireless network information is shared from one wireless device with other wireless devices through the distributed intelligence network, either through the central server or by communicating with other wireless devices, providing group-based intelligence about wireless networks to other wireless devices. Devices may further dynamically discover wireless networks that should not be used.

21 Claims, 16 Drawing Sheets

(56) References Cited

U.S. PATENT DOCUMENTS

| | | | |
|---|---|---|---|
| 8,516,096 B2 * | 8/2013 | LeBlanc et al. | 709/223 |
| 8,601,127 B2 * | 12/2013 | Lim et al. | 709/226 |
| 8,718,650 B2 * | 5/2014 | Doradla et al. | 455/436 |
| 2007/0171881 A1 | 7/2007 | Zhang et al. | |
| 2010/0165947 A1 | 7/2010 | Taniuchi et al. | |

* cited by examiner

| ESSID | BSSID | Reporting device ID | Location | Date & Time | Status | Performance | Connection process information |
|---|---|---|---|---|---|---|---|
| syslink | 01:aaa:34:12:33 | 111 | 38.948669, -77.323896 | 04/12/2030 09:09:022 | Connected | 13.365 1/28/0 | Open signed |
| syslink | 01:aaa:34:12:33 | 222 | 38.948607, -77.323719 | 04/13/2030 21:15:032 | Connected | 12.976 1/27/0 | Open signed |
| syslink | 01:aaa:34:12:33 | 111 | 38.948024, -77.323905 | 04/13/2030 13:22:072 | Connected | 14.573 1/29/0 | Open signed |
| syslink | 05:aaa:12:19:87 | 555 | 38.050703, -159.489464 | 04/15/2030 11:14:228 | Connected | 15/60.8/99/10 | Redirect, click through link |
| syslink | 05:38:57:2:22:11 | 333 | 38.923861, -77.2.3362 | 04/14/2030 06:64:152 | Failed | | Redirect, unable to navigate |

Figure 4

SYSTEM, METHOD AND APPARATUS FOR DYNAMIC WIRELESS NETWORK DISCOVERY

CROSS-REFERENCE TO RELATED APPLICATION(S)

This application claims priority to U.S. Provisional Patent Application Ser. No. 61/431,028, entitled "System, Method and Apparatus for Dynamic Wireless Network Discovery," filed on Jan. 9, 2011, the contents of which are incorporated herein by reference in its entirety.

TECHNICAL FIELD

This disclosure relates generally to a system, method and apparatus for dynamic wireless network discovery and, more particularly, to a distributed, self-learning network access system that assimilates and shares wireless network access information between mobile devices.

BACKGROUND

Many devices such as laptops, cellular phones, personal media players, cameras, book readers, etc. are now equipped with the capability to access the Internet through wireless networks. The number of devices having a number of different radio technologies built in to access networks of different types is also rapidly increasing. It is not uncommon now to be able to access one or more cellular data networks, in addition to wireless LAN networks. In addition, especially in the Wireless LAN space, more and more networks are becoming available that provide free or unrestricted Internet access. Some of these networks will be found in an opportunistic fashion, i.e. a device will not be aware of the functionality provided by a particular network until it connects to the network and attempts to perform the desired Internet service.

For most wireless LAN networks, e.g., Wi-Fi networks deployed in homes, restaurants, coffee shops, quick serve restaurants, hotels, airports, etc., it is not uncommon for a user to have to more or less randomly pick and test one network after another to find a usable, open network. Once one of these networks has been found and connected to, it is not uncommon for the user, or a piece of client software residing on the user's device on behalf of the user, to have to take additional steps, post-network authentication, to negotiate a successful Internet connection. This process is error prone and onerous to the user, and does not provide for ways to inform a user of networks not to use. It also does not provide for a method for one user to obtain network information and to then dynamically share this information with other users, either in their immediate vicinity at a given point in space and time, or through a collaborative, distributed network.

SUMMARY

In one or more embodiments, a system, apparatus and method are provided that provide a better, more automated method for users of wireless device to find, connect to, and use, free and open wireless networks, of which in some instances neither they, nor their computer or mobile device have prior knowledge. New gained knowledge about a wireless network is then shared with a central server, which in turn aggregates knowledge about wireless networks collected from various wireless devices, and takes all this aggregated knowledge and reduces the individual data points to aggregate data that provides valuable information about the status of the network. The central server then in turn distributes this information to a software client operating on other wireless devices.

In addition, in one or more embodiments, the present system, apparatus and method provide a way to share the dynamically learned network information from one user or wireless device with other wireless devices through a distributed intelligence network. One wireless device can discover a new usable wireless network and share this knowledge with other devices. Through the use of a large number of wireless devices with each collecting network information, it becomes possible for a centralized infrastructure to aggregate and distill this knowledge, providing this distilled group-based intelligence to other devices. In one or more embodiments, a system, apparatus and method further provide a comprehensive system for devices to dynamically discover wireless networks that a user should not use, such as at the request of the operator of an access point or the network infrastructure beyond that access point.

BRIEF DESCRIPTION OF THE DRAWINGS

FIG. 4 is a block diagram showing a number of mobile devices sharing information they have discovered about networks using a secondary communications link in accordance with one or more embodiments of the present disclosure.

DETAILED DESCRIPTION

In the description that follows, the present inventions may be described in reference to one or more embodiments for the dynamic discovery of wireless networks. The present inventions, however, are not limited to any particular application nor is it limited by the examples described below. Various modifications to the disclosed embodiments may be apparent to those skilled in the art and the general principles defined herein may be applied to other embodiments and applications without departing from the spirit and scope of the inventions. Therefore, the description of the embodiments that follow are for purposes of illustration and not limitation.

Reference in this specification to "one embodiment", "an embodiment", "other embodiments", "one or more embodiments" or the like means that a particular feature, structure, or characteristic described in connection with the embodiment is included in at least one embodiment of the disclosure. The appearances of, for example, the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Reference in this specification to a "mobile device" is intended to encompass any mobile technology computing device that connects to a wireless communication network, such as a laptop computer, cellular phones, smartphones or the like (e.g,. Apple iPhone, iPad, or iPod Touch, Google Android, BlackBerry, other type of PDA or smartphone), personal media players, cameras, book readers, or other handheld computing devices. Further, reference in this specification to a "wireless network" or "network" is intended to encompass any type of wireless network, such as but not limited to Wireless LAN, Wireless WAN, Wireless PAN, WiFi (e.g., IEEE 802.11), Bluetooth, or the like. The term "wireless network" or "network" may further include those cellular wireless communication protocols offered by a telephony operators, such as GSM, CDMA, WCDMA, LTE, etc.

Figure 1:
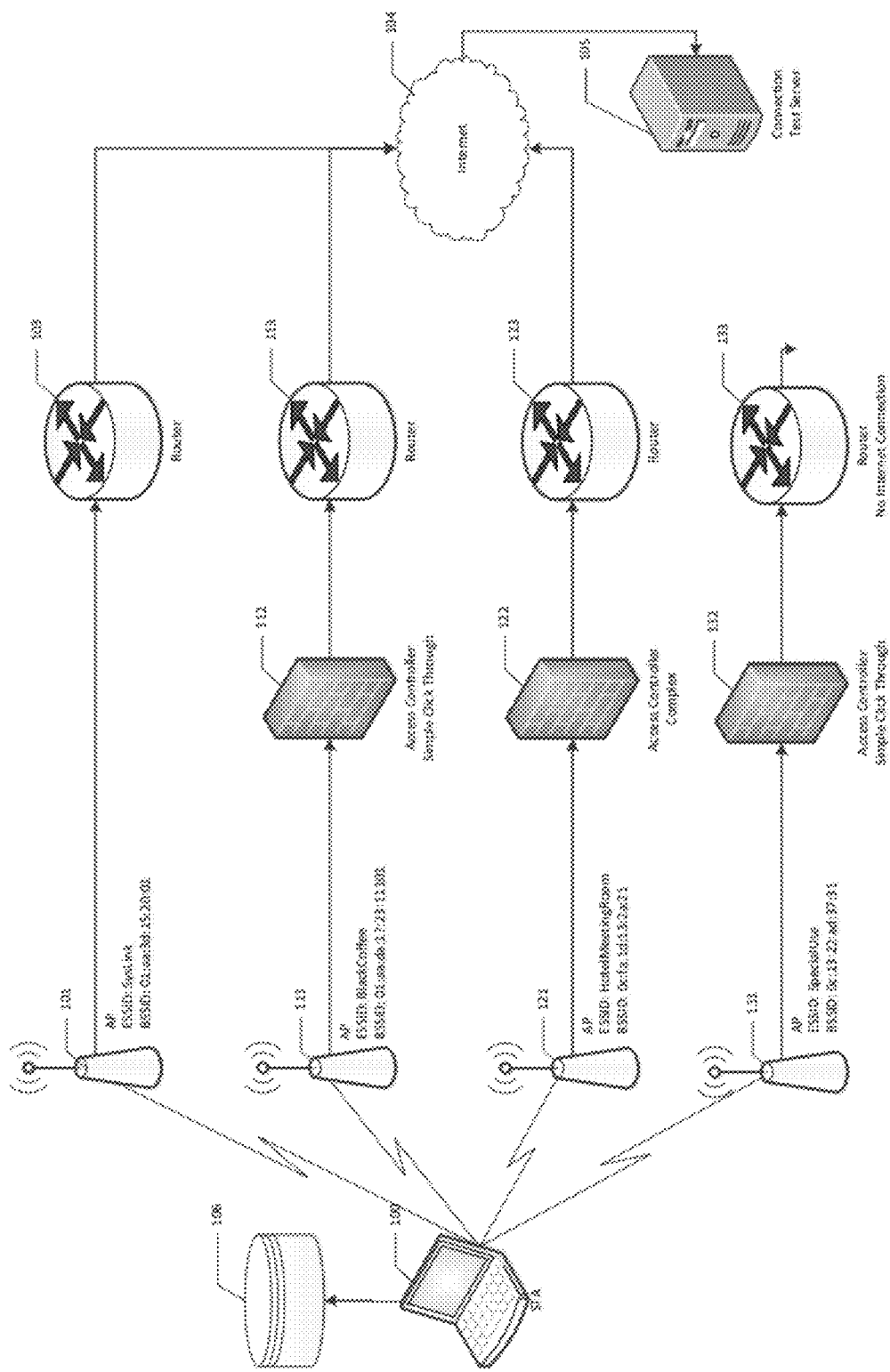
FIG. 1 is a block diagram of a mobile device automatically detecting and accessing various types of mobile networks in accordance with one or more embodiments of the present disclosure.

In one or more embodiments, a system and method for dynamically learning and sharing network information from one user or wireless device with other wireless devices is provided through a distributed intelligence network. Referring now to FIG. 1, a drawing of a mobile device 100 is provided in an environment where multiple networks are available. The mobile device 100 has a network interface capable of detecting any of these networks, and could therefore connect to any of the four networks. When connecting to certain networks, the device 100 may be able to connect to the Internet, whereas this Internet connection may not be possible in other networks.

Mobile device 100 is equipped with access client software (i.e., an access module installed on and operating on mobile device 100) that is capable of detecting the availability of wireless networks in its vicinity, such as by using one or more network interfaces in the device 100. This type of network detection happens for networks that could potentially provide free Internet access, such as 802.11 type Wi-Fi networks, as well as other types of wireless networks that can provide free network access. In many cases, including Wi-Fi, there currently is no indication of the disposition and open availability of a network; in other words, the access module software client on mobile device 100 cannot figure out merely from looking at the information in the beacon signals it receives from network Access Points 101, 111, 121, or 131 whether it can obtain free and open Internet access when connecting to the Access Point in question.

The software client on mobile device 100 includes database 106, in which the software client stores detailed information about the networks it has previously accessed. This database 106 is used by the software client to help determine what networks it has successfully or unsuccessfully used in prior network connection attempts. In the scenario shown in FIG. 1, it is assumed that there are no entries in the database for any of the networks transmitted by AP 101, 111, 121, or 131 (i.e., these networks have not previously been encountered by mobile device 100).

Assuming no prior knowledge of these networks, the software client on mobile device 100 can only determine the disposition of each network by trial and error, i.e. communicating with and making an attempt to connect to each of the networks. In one or more embodiments, the software client on mobile device 100 attempts to communicate with a remote connection test server 105 in order to determine the disposition of each network.

In an initial attempt, mobile device 100 may attempt to connect to access point 131, which in this example is an open network connection that does not use encryption, as such no prior knowledge or information is needed to connect to this network. Device 100 establishes a TCP/IP connection over the newly made network link, and attempts to make a HTTP connection to connection test server 105, which is connected to the Internet 104. In attempting to make this connection, an access controller 132 intercepts the request, and sends a re-direct response to the software client running on mobile device 100. This re-direct response results are intercepted by the software client running on mobile device 100, which subsequently negotiates with the access controller 132. This conversation is described in more detail in a subsequent drawing. After the conversation has succeeded, the access controller 132 opens a gateway and allows mobile device 100 to make another attempt to connect to connection test server 105. However, in this example, this connection attempt cannot reach the connection test server 105, as the router 133 has no Internet 104 connection. From this, the software client on mobile device 100 knows no Internet connection is available at this time through AP 131. The software client on mobile device 100 stores the newly learned knowledge of this network failure associated with AP 131 and its network in the database 106, which is locally stored by the software client on mobile device 100. Knowledge stored in database 106 includes the Network Name or ESSID, Media Access Control (MAC) address of the air interface, or BSSID, of AP131, the date and time of the connection attempt, and, if available, any specific location information, such as latitude and longitude information of mobile device 100 at the time of the connection attempt, as well as specific information regarding the specific steps used, timing, and traffic exchanged, in the negotiation between the software client running on mobile device 100 and the access controller 112 in the process of negotiation. In case of s successful connection, speed and latency information for a connection between the software client running on mobile device 100 and speed test server 105 are also stored.

In a subsequent attempt, mobile device 100 may connect to access point 121, which again in this example is an open network connection that does not use encryption, so no prior knowledge was required to connect to access point 121. In a similar fashion as described above, a TCP/IP connection is established, and the software client on mobile device 100 attempts to make an HTTP connection to 105. This connection is intercepted by a gateway, access controller 122. The software client on mobile device 100 attempts to negotiate with access controller 122, however, without prior knowledge, this negotiation fails. An example of such a scenario would be an access controller that produces a webpage on which a user would have to provide an access code or password that is not known by the client. The client recognizes the inability to connect to the Internet through AP 121, and this connection failure is also stored in the local database 106 by the software client on mobile device 100, along with the auxiliary information previously described. In this example, the HTTP attempt never even reached router 123. The software client on mobile device will continue on to the next AP.

In its third attempt, mobile device 100 connects to access point 111, which in this example is also an open network connection without encryption, and therefore does not require any prior knowledge. Once a TCP/IP connection is established, the software client on mobile device 100 attempts to connect to connection test server 105 through the Internet 104 using HTTP. This connection attempt is intercepted by access controller 112, which sends back a re-direct request to the software client running on mobile device 100. As described in a subsequent section, the software client is configured to be capable of negotiating with access controller 112, after which the access controller 112 allows a connection to router 113. Through this connection, the software client on mobile device 100 is able to connect to the connection test server 105 through the Internet 104. The software client now knows a connection to the Internet 104 (and connection test server 105) through AP 111 is indeed possible. The software client on mobile device 100 will update the local database 106 with information about access point 111 to indicate successful internet connections are possible at this point in time, along with the specific auxiliary information previously described.

The order in which the software client on mobile device 100 connects to the various access points can vary. In the above description, the software client on mobile device 100 found out in its third connection attempt that it was able to obtain Internet connectivity through AP 111. However, alternately, the software client on mobile device 100 might have initially attempted to connect to access point 101, which in this example would have been feasible since the AP 101 uses no encryption and no prior knowledge was required to find the AP 101. If AP 101 had been initially tested, the software client on mobile device 100 would have obtained a TCP/IP connection through AP 101, and as described above, would have attempted to connect to connection test server 105, to determine whether a connection to Internet 104 exists. Router 103 would have sent the traffic from the software client on mobile device 100 straight to Internet 104, which would have been delivered to connection test server 105. The connection test server 105 would in turn provide a response of a successful connection to the software client running on mobile device 100. The software client on mobile device 100 would then store information about the successful connection to AP 101 in its local database 106, as well as the additional specific information previously described.

Figure 2:
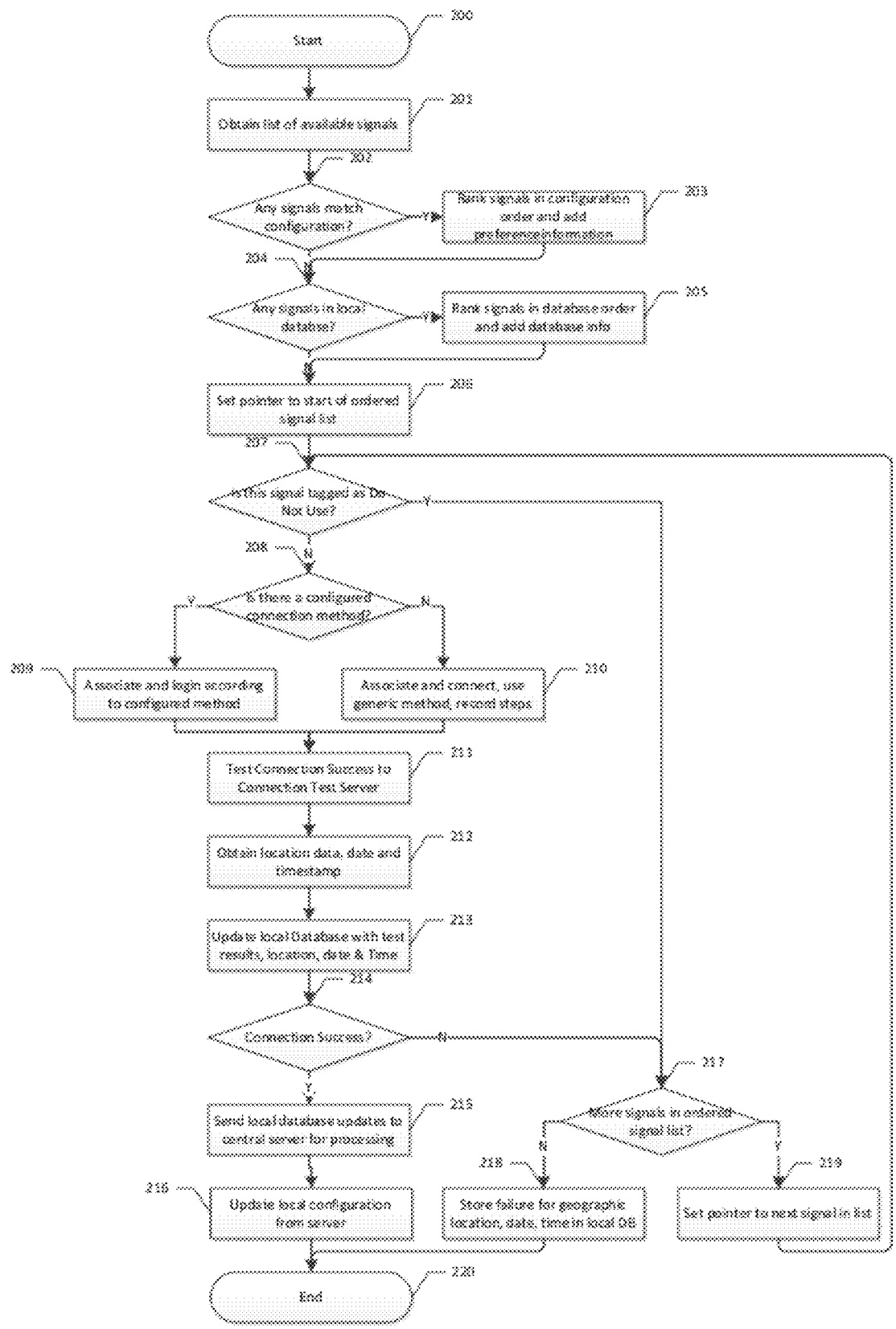
FIG. 2 is a block diagram of the interaction between the end user device and the centralized system elements used to aggregate and distribute data in accordance with one or more embodiments of the present disclosure.

Referring now to FIG. 2, a process flow diagram is illustrated that shows the process of network detection and association of signals performed by the software client on the mobile device 100. In one or more embodiments, this further describes the process referred to in the description of FIG. 1. The software client on the mobile device 100 starts at operation 200. In operation 201, the list of all available signals being broadcast is obtained by looking at beaconing frames sent out by the network access points in range of mobile device 100. If needed, mobile device 100 will send out its own beaconing frames to entice access points to make their presence known. All available radios on the mobile device 100 can be used; as such this technique will work for 802.11 Wi-Fi related technologies, but can also be used for any other radio technologies the device might use to obtain an Internet connection. The signals obtained in operation 200 are compared to the software client's configuration in operation 202. This configuration is previously sent from a central server infrastructure to tell the software client what networks the central server knows about that the software client can use. This configuration is stored locally on mobile device 100. If any of the signals detected by mobile device 100 in operation 201 match networks appearing in the retrieved configuration, these signals are updated in operation 203 to add to them all the information required for the software client to make a decision with regards to using these signals for a network connection, such as ranking, speed, business rules, and quality information, as well as any information required to successfully associate with and subsequently login to the networks associated with the signals.

Since not all signals will be matched by the configuration, and since the software client may already have obtained signal information that it has stored in its local database 106, operation 204 checks whether any of the signals in the list detected by mobile device 100 in operation 201 are present in the local database 106, kept by the software client on the mobile device 100.

If any signals match those signals appearing in the local database 106, the list is subsequently updated in operation 205 with information local to the client on the usability, techniques used, quality, and stability of these signals. Take for example a software client on a mobile device 100 that has already been through the full discovery cycle, for all networks, as described in FIG. 1. This software client will have populated its local database 106 with the identifiers of the signals it could successfully connect to and their quality information or other auxiliary information. By updating and ranking the signal list detected in 201 with information previously obtained from a prior discovery cycle in 205, the software client on mobile device 100 will end up with an updated signal list in which the signal with the highest chance of success, based on previous experience for this user or mobile device 100, can be set to be the first attempt on the connection list, which should result in the most efficient connection process for the mobile device 100.

In operation 206, the list of signals can be ranked and/or ordered by criteria of configuration (i.e., business rules and cost information obtained from operation 203), and based on previous experience with the signals (i.e. success, failure, speed, etc.) obtained from operation 205, where the first signal in the ordered list is now the most likely signal to yield a connection. A pointer is set in operation 206 to now be pointing to this signal that is the most likely signal to yield a connection to the Internet.

Operation 207, and the process flow following it, are repeated for each signal on the list until there has been success in connecting to a signal and in turn to the Internet, or until all available signals have been exhausted.

The software client running on the mobile device 100 checks the individual signal in operation 207 to determine if the signal has been tagged as a signal that should not be used. This tag can have been added either from configuration data previously received from a centralized server (e.g., in operation 203), from information stored in local database data (e.g., operation 205), from a communication signal received by the mobile device 100 (i.e., either together with the detected signal or broadcast separately via a separate signal). If a signal is marked as 'do not use', the flow continue in operation 217, which is described below. The benefits and features associated with marking a signal with a 'do not use' tag will be further described herein with respect to other embodiments of the disclosure.

A signal that is marked for use (i.e., can have a specific tag indicating that the signal is for use or for certain uses or cam simply be a signal that does not contain a tag indicating that it should not be used) is further evaluated in operation 208, where the software client on the mobile device 100 checks to see if this signal has any connection instructions provided through central configuration. These instructions would typically be specific to the network associated with the signal, and will generally provide the fastest, most success path to connecting to, and logging in to, the network.

If such configuration data does exist, the software client on the mobile device 100 continues on to operation 209, where the software client on the mobile device 100 it attempts to associate, and if needed, login to, the network in question using a login method based on configuration parameters provided in the configuration.

If configuration data for the network does not exist, the software client running on the mobile device 100 proceeds to operation 210 instead, where a generic approach is used to attempt to access the network. This approach uses a number of known techniques to attempt to make a connection to the network, and subsequently to reach the Internet 104. One such technique consists of simply associating with the network, and checking to see if an Internet connection is subsequently available, as described for FIG. 1. Another approach navigates a connection gateway by dynamically interacting with web-based content served up by the gateway in an attempt to agree to terms and services on the users behalf, and to obtain an open Internet connection without requiring user interaction. Whereas in operation 209 where specific prior knowledge of a network and it's login methodology was required and where the method only works on specific networks, operation 210 is instead a more generic method that should work on many networks for which the client does not have specific information. As such, the methodologies used in operation 210 can provide access to more open and free networks than are part of the configuration information received from a centralized infrastructure. Operation 210 also records the exact operations that software client running on the mobile device 100 took to attempt to obtain network access; these operations will be used as described below to make subsequent connection attempts more successful.

Once the connection process in 209 or 210 has succeeded, the software client running on the mobile device 100 will check for the validity of the Internet connection by contacting the connection test server 105, as described as part of FIG. 1. If this connection test is successful, the software client running on the mobile device 100 will now know that the mobile device is "on-line" and connected to the Internet. In addition, as part of this test, speed and latency readings can be taken, which provides a measure of the quality of the connection made available to the user. If this test does not succeed, this provides absolute information to the software client running on the mobile device 100 that the connection will not be usable.

In one or more embodiments, after the connection test is completed, the software client may obtain the best location information it can obtain in operation 212. This information might be provided as a result of using Global Position System (GPS) technology for mobile devices 100 that are so equipped, or it might come from information available on-line based on the mobile device's Internet address, or from any other means available to the software client. To the extent available, date and time information associated with the connection test is also obtained. This information is combined with the information gathered in the previous steps of the connection process and stored in local database 106, resulting in end-user knowledge of the networks, locations, date, time, connection method used, success, and, if successful in connecting, performance of the network connection.

A local database (e.g., database 106) of information the software client keeps on the mobile device 100 is updated in operation 213. Since this operation is performed for each and every connection attempt made by a client on a mobile device, there is a wealth of information in this database, as a software client continues to make connections at subsequent points in time to additional signals. This connection information is stored regardless of whether a connection attempt resulted in a successful connection or not, thus ensuring that the client can improve its performance over time, by not using signals to which it could not successfully connect repeatedly when other signals might be usable instead.

In operation 214, the software client running on the mobile device 100 considers the result of the connection test performed in operation 211 to determine whether a successful connection has been established. Criteria for success can vary and can be configured. For example, criteria for success can be as simple as 'does internet connectivity indeed exist,' but can also extend to the quality of the Internet connection; for example latency of the connection, amount of packets dropped, bandwidth or throughput, and other quality of service parameters can all be taken into account in the decision on the suitability of a given signal.

If in operation 214 the software client on mobile device 100 determines a successful connection has been established, the software client will, in operation 215, send any local database updates that have been made since the last time it sent an update, to a central server. These updates will include all information gathered in the previous operations, including signal information, ranking, connection steps, success, failure, connection test information, date, time, other visible networks and access points, and quality information. This provides the central server infrastructure, described elsewhere herein, with a true end-user view of the network and how well it works. Note that the database of information persists between various runs of the processes described here; in other words, even if an attempt does not result in a successful connection, which makes it potentially impossible for the software client running on the mobile device 100 to upload it's database contents or changes to the centralized server (which would require a successful Internet connection), the software client will keep copies of this information in its local database. Once a connection succeeds on a subsequent attempt, all information is sent to the central server. This approach provides the broadest set of data available. This data in turn can be processed by the central server, and turned into configuration information, which is then sent back to numerous software clients running on numerous mobile devices, providing a de-centralized, self-learning system. This aspect of the present approach is described in more detail herein and with reference to other figures.

After the local database updates have been sent to the centralized server, the software client on the mobile device 100 will update its configuration with any new information from the central server in operation 216. This configuration data can contain new information on known networks the software client can use, which in turn can be derived from database updates from this software client or from other software clients that have been sent to the central server. As the software client is now connected, and fully updated, operation 220 completes the connection test and update process.

If in operation 214 a connection was deemed to not be successful, or if in operation 207 a signal was deemed to not be suitable for use, the software client running on the mobile device 100 will continue with operation 217 to determine if other signals deserve consideration. If other signals exist in the list from operation 206, the pointer is updated to point to the next signal in the list, and the process continues for the next signal on operation 207. If no other signals are worthy of consideration for the current location for the software client running on the mobile device 100, the local database is updated in operation 218 with the current location information, if available, and with the information that in this location no usable signals existed resulting in failure. This information is both used by the software client running on the mobile device 100 in subsequent connection attempts, and, when a connection to the central server exists, this information is sent to the central server as well (as described in a subsequent figure), where this information from numerous clients is processed into usability data and configuration data.

Figure 3:
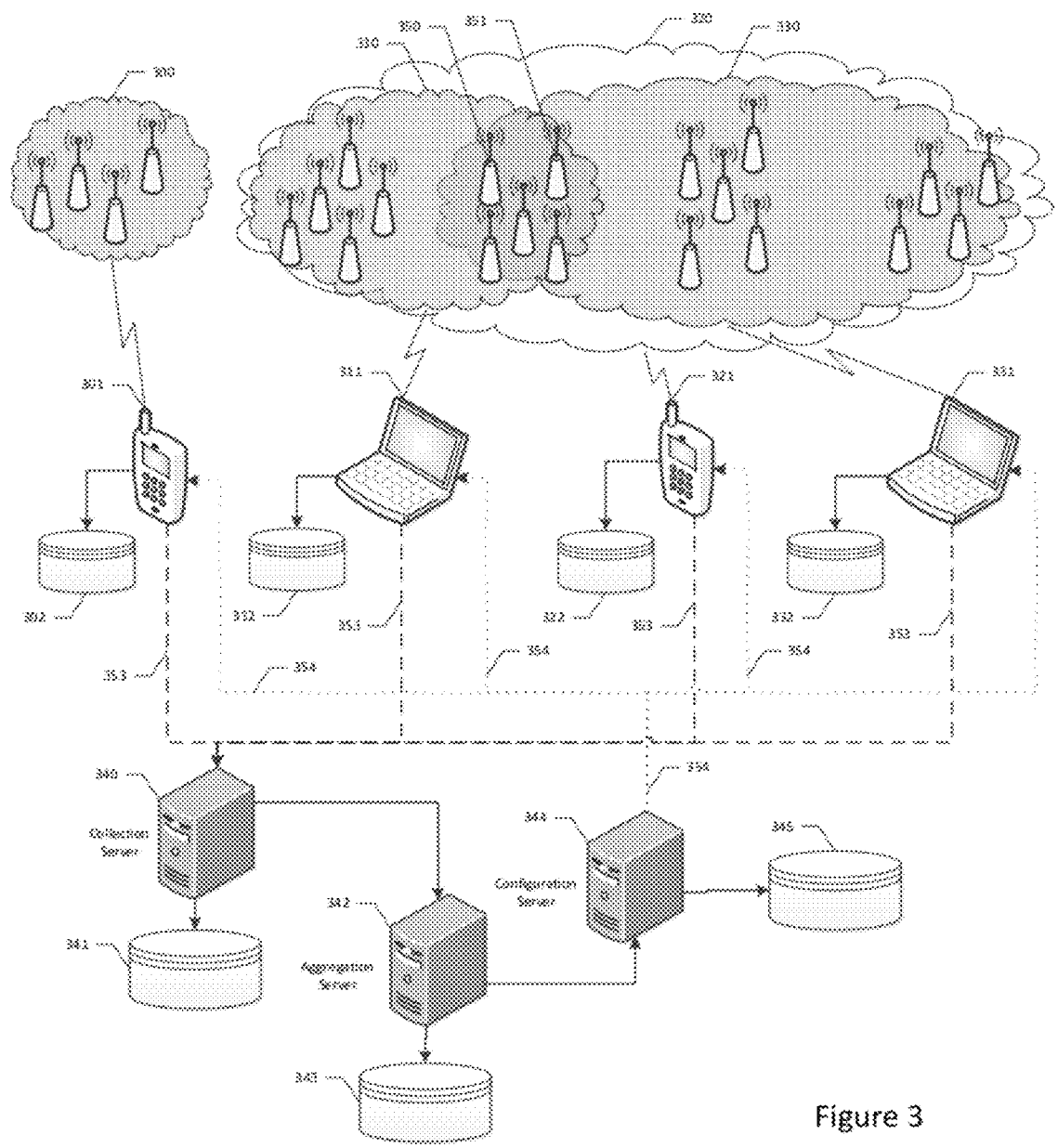
FIG. 3 is a block diagram showing various mobile devices locally sharing information using a secondary local communications link in accordance with one or more embodiments of the present disclosure.

Referring now to FIG. 3, a schematic block diagram of the components of the overall system is illustrate to demonstrate how the mechanism works that gathers the connection success and failure data gathered by software clients running on mobile devices as they connect to networks, then processes this data to distill down information useful for all clients, and subsequently distributes this information back to the software clients running on mobile devices.

Cloud 300 (shaded with slanted dashes) surrounds a set of networks that, over a period of time, has been visited by a software client running on a mobile device 300. These networks have been visited over a period of time, i.e. not all networks were necessarily seen at one time. By the process described in FIG. 1 and FIG. 2, client software running on mobile device 301 has gathered information about the connection methods, usability, location, and quality of all these networks; this information is locally stored by the software client running on device 301 in the local database 302.

Similarly, cloud 310 (shaded with vertical dashes) shows the set of networks that in an identical manner have been seen, and to which access attempts have been made, by software client running on mobile device 311, with results stored in local database 312.

Cloud 330 (shaded with horizontal dashes) shows the set of networks that, in an identical manner, have been seen, and to which access attempts have been made, by software client on mobile device 331, with results stored in local database 332. Note that the cross-hatched overlapping area between cloud 310 and 330 contains access points that have been accessed by software clients running on both mobile devices 311 and 331, with each device containing its unique data from accessing these networks. The data each mobile device has gathered can differ, as the success each mobile device had in connecting to a network will differ.

Cloud 320 (not shaded) shows the set of networks that, in an identical manner, have been seen, and to which access attempts have been made, by software client on mobile device 321, with results stored in local database 322. Note that the network information gathered in database 322 relates to some access points for which there's also data in databases 312 and 332 associated with mobile devices 311 and 331, however, each set of network data is considered from the unique point of view of a given software client running on a given device, at a given point in space, and a given point in time.

For purposes of this example, it is assumed that none of the networks shown in clouds 300, 310, 320, and 330 are networks that have been previously disclosed to a software client in configuration data it has received from a centralized infrastructure (e.g., configuration server 344). Using the mechanism described in FIG. 1 and FIG. 2, each network was autonomously discovered and tested, and the software clients running on mobile devices 301, 311, 321, and 331 stored this new-found knowledge locally in their respective databases 302, 312, 322, and 332.

All of these unique points of data can be combined to provide a collective insight into the functioning of different wireless networks. This data can then be combined to provide an aggregate insight into network functionality, which can help software clients on mobile devices more effectively use mobile networks.

Once a successful Internet connection is established as described in FIGS. 1 and 2, collection server 340 gathers updated copies from information stored in the local databases 302, 312, 322, and 332 of mobile devices 301, 311, 321, and 331. As described in FIG. 2, the software client running on the respective mobile device will send updated copies of these local databases to the collection server 340, as depicted by the dashed lines 353. The collection server 340 stores the combined information received from all software clients in database 341.

An aggregation server 342 connected to communicate with collection server 340 subsequently processes the data gathered by collection server 340 according to business rules, where the aggregated data is subsequently stored in database 343. The aggregation process is described in more detail in FIG. 4.

A configuration server 344 connected to communicate with aggregation server 342 takes the aggregated data, applies business rules, and stores this aggregated data, along with other configuration data, in database 345.

Upon successful Internet connections, software clients running on mobile devices 301, 311, 321, and 331 will subsequently come and retrieve new configuration data from configuration server 344, as depicted by the dotted lines 354. Alternatively, the new configuration information can be broadcast from configuration server 344 to the various software clients running on mobile devices 301, 311, 321, and 331. This data will now reflect information about networks from an end user vantage point, as gathered by other clients.

For the purposes of further illustration of the overall dynamic network discovery and status update procedures performed by the overall system, an example will be presented for completion of the entire process with respect to networks 350 and 351 of FIG. 3. Client software running on mobile devices 311, 321, and 331 have each seen these two networks 350 and 351. Assuming all three mobile devices 311, 321, and 331 reported that network 350 was unusable, and that network 351 was usable. Each software client for mobile devices 311, 321, and 331 would have separately sent this information to collection server 340, which would have stored it in database 341. Aggregation server 342 can now conclude that network 350 was consistently not usable and that network 351 was consistently usable. In one or more embodiments, more than three data points would preferably be used to draw this type of conclusion, as the greater number of data points will provide a greater degree of certainty in the conclusion. As a result, aggregation server 342 will now update configuration server 344 with the information that network 351 is preferred and that network 350 should be avoided. When the software client running on mobile device 301 subsequently obtains a configuration update from configuration server 344, as indicated by the dotted line 354, it will gather this information on networks 350 and 351. Mobile device 301 has not previously encountered networks 350 and 351. If mobile device 301 subsequently finds itself in a situation where it detects either or both of networks 350 and 351, mobile device 301 would know to attempt to connect to network 351 prior to attempting to connect to network 350 or possibly to avoid attempting to connect to network 350 altogether.

The combination of the collection server 340, aggregation server 342, configuration server 344 and their associated databases 341, 343, and 345 comprise the main components of the central server infrastructure described herein. While the collection server 340, aggregation server 342, and configuration server 344 and their respective databases are described as separate components in communication with one another, it is understood that all or some of these components and their associated functionality could be combined together into the same component or further divided into yet even further components.

In accordance with one or more embodiments, FIG. 4 shows a representative example of the data that the collection server 340 could receive from a number of software clients running on mobile devices 301, 311, 321, and 331. Each of the columns 401-408 in the table of FIG. 4 represents a type of data point gathered by the client software running on mobile device 301, 311, 321, and 331 and reported to collection server 340.

Column 401 contains the network identifier for the network the software client has detected. In this example, a Wi-Fi (802.11) specific ESSID was used as the network identifier, but any other network identifier used in other technologies may be substituted. This is the primary identifier seen by the software client running on a mobile device.

Column 402 contains the hardware address for the given network access node associated with the network that has been detected. For this example, a BSSID associated with Wi-Fi (802.11) specific addressing is shown, but, for other technologies, appropriate addressing can be used. As such, this approach is not limited to Wi-Fi networks.

In one or more embodiments, it should be noted that the network identifiers in column 401 are not unique. In this example, this demonstrates that the ESSID identifiers in Wi-Fi are commonly not unique. Note that the combination of column 401 and 402 have a high likelihood of forming a unique pair; this is they key to identifying individual networks.

In the interest of simplicity, in this table, only unique networks with one Access Point have been shown. In reality, the tables tend to have many more entries than demonstrated here. As described previously, the more data that is gathered and processed, the more accurate the network assessments tend to become.

Column 403 contains a unique identifier for each software client or mobile device reporting connection information. This identifier helps the collection and aggregation server assess the source of data, and correlate various connection reports.

Column 404 contains specific location data for the network being reported on. For example, longitude and latitude coordinates as determined from GPS or other location information sources. This location data allows the aggregation server 342 to place networks in a given location, which makes it possible to provide the software client running on mobile devices with specific configuration data that relates to the surroundings of their immediate location. This is an important function to limit the size of configuration data a mobile device needs to receive and store. Secondarily, this location data makes it possible to show usable network locations on a map, and to provide directions to users of mobile devices to get to a usable location the system has learned about.

Column 405 contains the date and time of the connection attempt reported. This allows the aggregation server 342 to correlate reports over time, and to make assessments of how networks work over time or as a function of time. The benefit of this approach is that the aggregation server 342 can detect when a network has changed over time, or, given enough data points, whether a given network only works at certain times of day.

Column 406 contains the status of the connection. For simplicity, in this example, only a successful connection and failed connection were shown. In one or more embodiments, many other statuses can be reported as well. In addition to reporting networks to which a software client running on a mobile device connects, it also reports information on networks it sees in the vicinity while connecting. Those networks could be reported as visible, but not connected to. The aggregation server 342 can take this data to produce graphs of network visibility given the mobile device's location at the time of reporting.

Column 407 contains a much simplified example of the type of performance data a software client running on a mobile device will report based on making a connection and running a test to connection test server 105. For this example, the table shows peak download speed in megabits per second, peak upload speed in megabits per second, latency in milliseconds, and percentage of IP packets dropped. In one or more embodiments, other information, such as relative signal strength, raw network connection speed, etc. are also reported and desired for specific implementations, but were omitted for simplicity in this depiction.

Column 408 provides connection process information, which gives a description of the steps the software client running on the mobile device had to go through to connect to the network and get to the Internet 104. Again, this column is shown in a vastly simplified manner for clarity. "Open Signal" identifies that when a connection was made, no additional steps were needed to make a network connection. "Redirect, Click Through Link" would identify a process (as described in FIG. 1) where a client encountered a gateway and had to navigate the gateway to connect. In this case, additional information is reported describing precisely what content was presented as part of the redirection and what the client had to do to login. Likewise, for the "Redirect, Unable to login" case, a detailed report would be provided to indicate what the client software encountered and what problems it ran into when attempting to navigate the gateway.

Each of the rows 410-414 in the table of FIG. 4 represent an individual report from client software running on respective mobile devices 301, 311, 321, and 331 (as identified by the reporting device ID in column 403) and reported to Collection Server 340.

In this example, rows 410 through 412 show three connection attempts from 3 different mobile devices to one network. The uniqueness of this network is determined from the correspondence of information in columns 401 and 402, namely based on the correspondence between the network identifier (e.g., ESSID="sysLink") and the access point identifier (e.g., BSSID="01:aa:34:12:33"). Column 404 gives an indication of the coverage area of this network, and the usability of the network within this area; although the location in which the usage occurred for each of the attempts is not unique, the proximity of the locations of the three attempts provides this valuable information. The variable times shown in column 405 provide an indication of the availability of this network over time. As described in FIG. 3, and in more detail in FIG. 5, all this information is combined by the aggregation server to make determinations on network availability and network information to be shared with other software clients running on mobile devices.

In this example, row 413 shows the software client on mobile device 301 successfully connecting to a network which has the same ESSID as the networks shows in rows 410-412. However, since the geographic location, as identified in column 404, is well outside of the range of this wireless network, the aggregation server 342 can determine that this is a different, unique network that needs to be considered separately.

In this example, row 414 shows software client on mobile device 311 failing to connect to another network which goes by the same network identifier (i.e., the same ESSID). Based on the location information provided in column 404, the aggregation server 342 will be able to determine that this is indeed a unique network from other networks listed in the table. Although the connection failed, as shown in column 406, the aggregation server 342 receives detailed information, depicted in column 408, about the attempt the client software running on the mobile device made to connect to the network. As mentioned before, in the interest of simplicity, the detailed report has been omitted from this table, but will typically include the nature of redirect information, and the steps the client took to attempt to the network. This information can be used to determine methods the client might use to successfully connect to the network, or, if such methods cannot be provided, might be used to inform software clients to not attempt to connect to this network in the future.

In one or more embodiments, the data collected and stored by software clients running on mobile devices which, in turn, is sent to collection server 340 and that is aggregated by aggregation server 342 may include only portions of the data illustrated in the table of FIG. 4 or could alternatively include other further data that would be relevant to the aggregation of distributed dynamic network discovery findings of the present disclosure.

Figure 5:
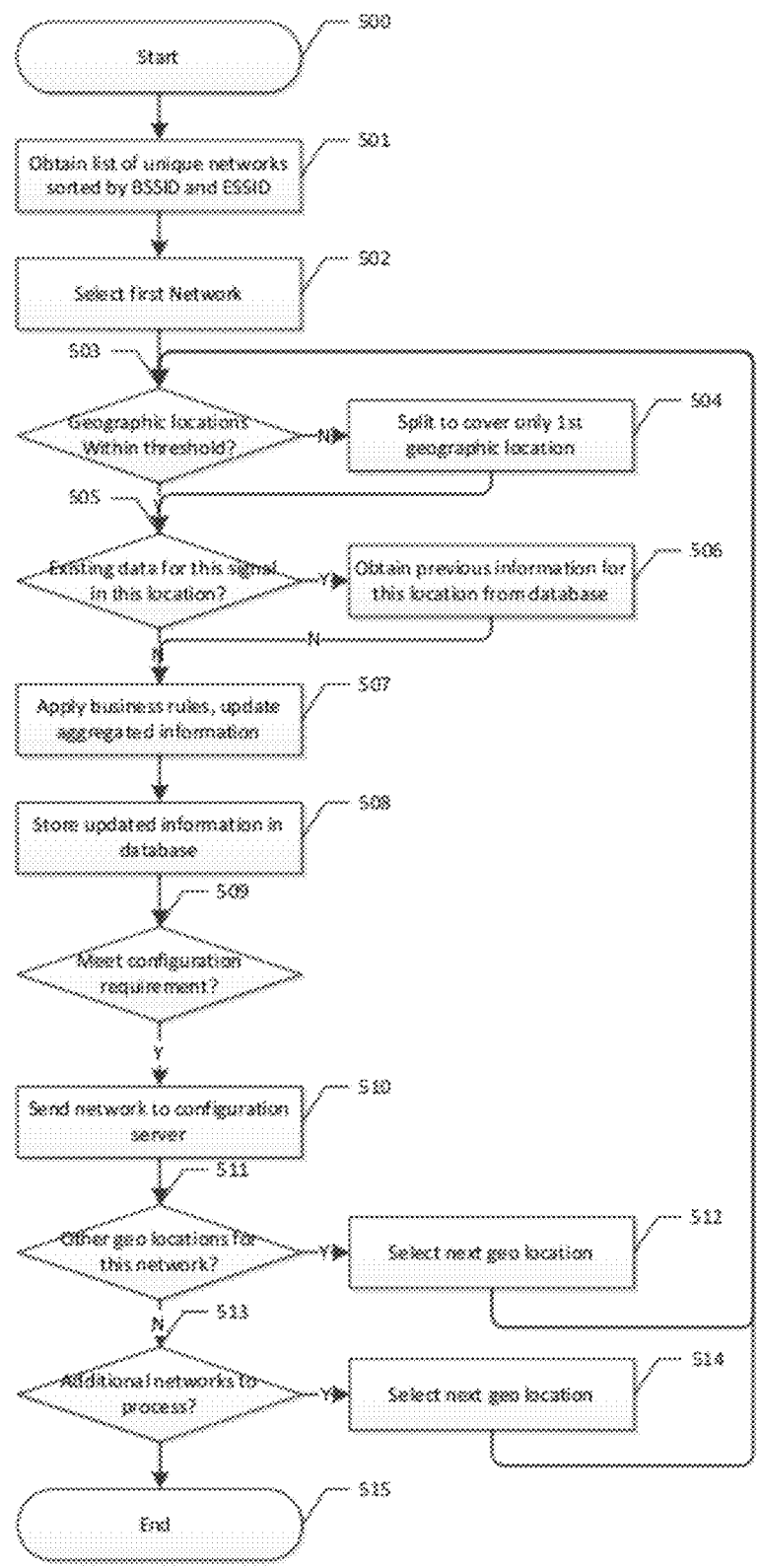
FIG. 5 is a block diagram showing how mobile stations can take advantage of location tagging and available location data when sharing connection information they have discovered in accordance with one or more embodiments of the present disclosure.

Referring now to FIG. 5, a schematic flow diagram is provided to show the flow of one possible implementation of the data aggregation process performed by the aggregation server 342 described in FIG. 3, based on sample data shown in FIG. 4. The example shown is specific to WI-FI 802.11 networking in terminology used, however this same approach can be used with networks of different types.

In operation 501, aggregation server 342 obtains the complete list of network information from collection server 340. This is the list of all information gathered by the software clients running on mobile devices as they are discovering and using networks. As described in FIG. 4, this list will contain information about the network, (ESSID or Service name), hardware identifier and/or address (BSSID), location (latitude and longitude) if available, date and time of the connection attempt, results of the connection attempt, steps used when connecting, performance of the connection if a connection was made, and information about other network access points visible while the connection is being made. The list is sorted by ESSID (Service name) and BSSID (Hardware identifier) by access point.

In operation 502, the first ESSID (service name) is selected, and all associated data for this ESSID is considered. Note that for non-Wi-Fi services, another service identifier can be used. All BSSIDs for this given ESSID will initially be considered as being one network. Based on the data in FIG. 4, the initial ESSID selected will be 'sysLink'. The following operations are repeated for each ESSID (service name) present in the collection server 340. In the specific example associated with FIGS. 4 and 5 (and other Figures herein), Wi-Fi (802.11) specific network or service names (ESSID) and Access Point hardware addresses (BSSID) are described, but it is understood the present techniques described herein are equally applicable to any other wireless technologies using each technology's specific parameters and can contain appropriate respective identifiers.

In operation 503, the geographic locations for the entries for this ESSID are compared against a threshold set for the technology being used. Given that this example is using Wi-Fi, and given that entries 410-414 are considered, not all locations would be found to be within the threshold. If all locations are not found to be within the acceptable or predefined threshold, in operation 504, the set of geographic locations will be reduced to only a single 1 geographic location for the next operations. For this example, the geographic location for the 'sysLink' ESSID will be reduced to the data contained in rows 410-412 that are within a single geographic location. As will be described later, additional data will be considered in a future iteration.

Once limited to a single geographic location or if all locations had been found to be within the acceptable or predefined threshold, execution by the aggregation server 342 would continue with operation 505. In operation 505, the aggregation server 342 checks the local database 343 to see if it has previous information on this network within the threshold of geographic boundaries based on information previously reported. If such information exists, in operation 506 the information is retrieved from the database 343 for consideration alongside the newly received information, and processing continues in operation 507. In case such information does not exist, processing continues in operation 507 without any prior information to consider.

Business rules are now applied in operation 507 to determine the disposition for this signal. Business rules could include the number of reports of success and failure that are required to include a signal in configuration, the time period over which as signal has been usable or unusable, the performance of a signal, and the consistency of the signal, just to name a few examples. It is understood that other business rules could be applied as well. After applying the appropriate business rules, the aggregated information for the signal (i.e., the specific network) is now updated.

Operation 508 stores this updated information in database 343 for future use by the aggregation server 342. In operation 509 the signal information is considered against the business rules to determine whether it is eligible for inclusion in the configuration to be sent to various software clients. For example, based on the business rules, in this example it could be decided that based on the consistently successful connections as reported by attempts 410-412, the corresponding signal is of sufficient quality that it should be added to configuration so other software clients installed on mobile devices will know to prefer this signal when they find themselves in the geographic vicinity of the signal.

As a result, in operation 510, the configuration server 344 is notified to add this signal (i.e., network) to its configuration in database 345. As described previously, the configuration server 344 then distributes the network that was newly discovered by software clients running on mobile devices 311, 321, and 331 to other software clients when distributing configuration information to the appropriate software clients (e.g., all software clients or only those software clients on mobile devices in certain geographic regions). In this example, the software client on mobile device 301 would learn about the available use of the added network (i.e., the network having the 'sysLink' ESSID in this geographic location or at the same network identifier), and the software client on mobile device 301 found itself in the vicinity of this network at a future date, mobile device 301 would assume that it can use the network, based on the prior successful experience of other software clients running on mobile devices in the vicinity of this network. In case a determination was made this network should not be added to configuration, operation 510 would be skipped. For example, there may not have been enough reported successful or unsuccessful attempts from various software clients running on mobile devices to merit inclusion in the stored configuration in database 345, but knowledge of these attempts would be retained in databases 341 and 343, so that this data can be considered again in the future.

In operation 511, the process considers if additional information exists for this network but for a different geographic location that has not yet been considered. For example, with respect to the example of FIG. 4, rows 413 and 414 that were at a different geographic location have not yet been considered.

In operation 512, the next geographical location is selected, in this case the location identified in row 413, and the process moves back to operation 503 and repeats the above-described operations. If there is no additional information in the database 343 for aggregation server 342 associated with the location identified in row 413, then the business rules would have to be applied to determine whether having data on just this one location would meet our business rules of publishing this location to configuration. If not, then only operation 508 results in storing this new information in the database while operation 510 of sending the information to the configuration server 344 will be skipped.

In this example, the process would again continue to operation 512, where the final geographical location for this network is now selected, and row 414 is evaluated In this example, the location identified in row 414 would meet similar results as those of row 413, assuming the business rules state that one failure is not sufficient to configure this network as 'unusable.' This information is however stored in the aggregation server database 343, so that when additional information from other software clients running on mobile devices arrives subsequently, the information for this location can be aggregated to determine whether the business rule threshold can then be met such that configuration updates can be provided for this network at this location.

When all data has been processed for this network and for all of its geographic locations, operation 513 determines if additional networks need to be processed. If so, operation 514 selects the next network, and the process starts anew at operation 503. This loop continues until all networks have been processed. If no networks are left to process, operation 515 completes the process.

In the various embodiments described above, network discovery and usability information is dynamically determined by distributed software clients running on mobile devices and reported back to a centralized server infrastructure, where the data collected by the centralized server infrastructure is aggregated according to business rules to improve and/or refine the reliability of this information to yield configuration information. This configuration information is then distributed to certain software clients running on mobile devices for use in improving the efficiency of such mobile devices in locating and connecting to wireless networks.

In one or more embodiments, connection information for wireless networks can also or alternatively be received by mobile devices from other sources than the centralized server architecture. For instance, mobile devices can share observed connection information between mobile devices. Further, connection information for wireless networks can be broadcast for receipt by mobile devices in a certain vicinity (e.g., broadcast by a network provider or by retail stores providing WiFi access points for a wireless network connection to the Internet). In one or more embodiments, such broadcast network connection information can be broadcast over a secondary or separate communication protocol or channel that is different from the primary wireless communication protocol or channel to be used to establish the connection to the wireless network.

Figure 6:
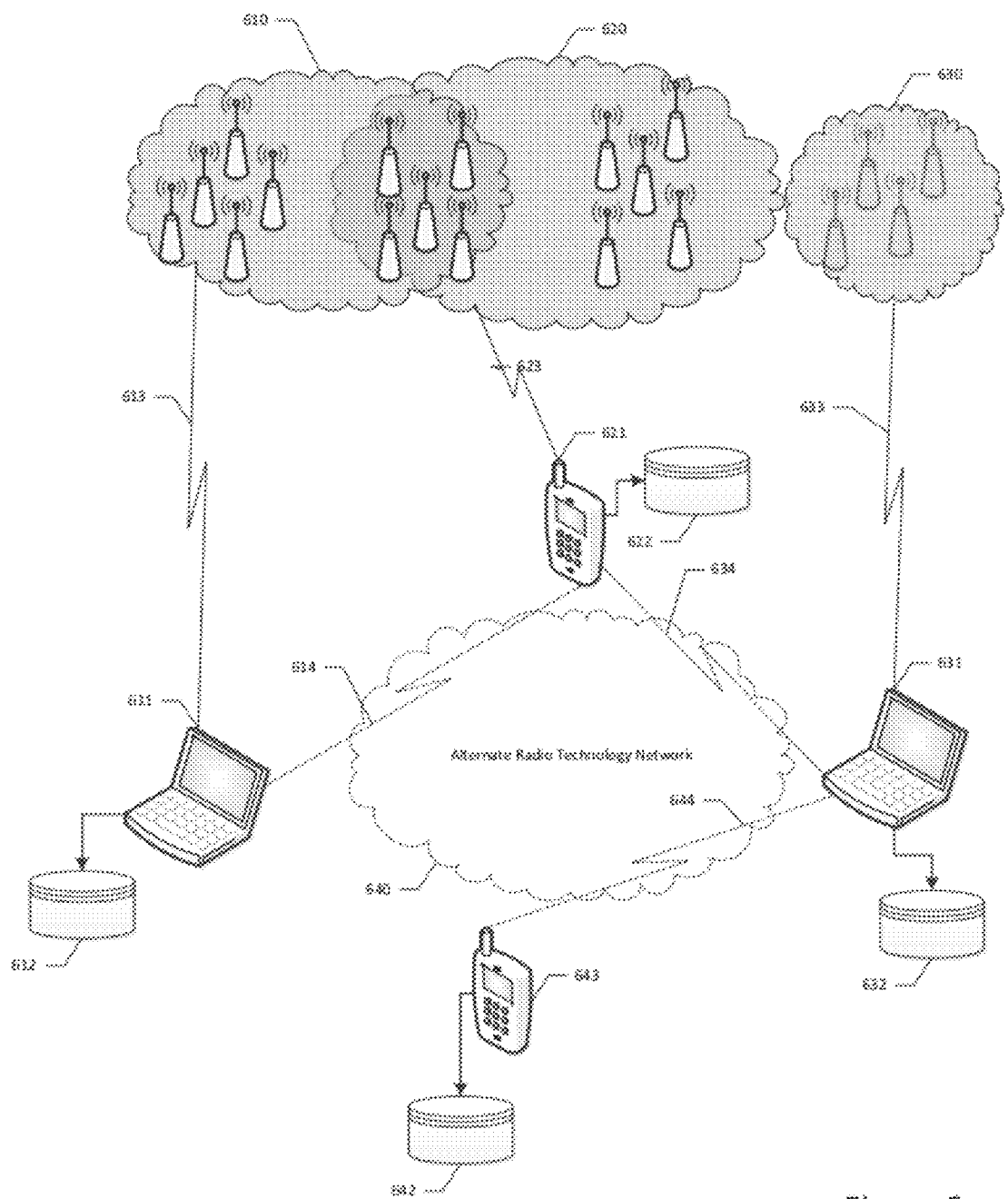
FIG. 6 is a block schematic diagram of various system components that could be used to provide such another type of connection information sharing by sharing observed connection information between mobile devices directly using a secondary local area radio connection, in accordance with one or more embodiments of the present disclosure.

Referring to FIG. 6, a block schematic illustration is provided of various system components that could be used to provide such another type of connection information sharing by sharing observed connection information between mobile devices directly using a secondary local area radio connection, in accordance with one or more embodiments.

Clouds 610, 620, and 630 contain primary access wireless networks (e.g., 802.11 WiFi networks) that are the wireless networks to which a mobile device wishes to connect to in order to obtain Internet access. Mobile device 611 can see the wireless networks in cloud 611 (shaded with vertically stripes). Using the connection process described herein in accordance with one or more embodiments, a software client running on mobile device 611 will populate local database 612 with connection information, which will include the networks in Cloud 610 successfully connected to, and networks not connected to, as previously described in FIGS. 3 and 4. For clarity, the primary wireless connection between the mobile device 611 and the networks appearing in Cloud 610 is indicated by wireless connection 613.

Mobile device 621 similarly can detect the primary access networks contained in cloud 620 (shaded with horizontal striping), and maintains information about success and failure connecting to these networks in local database 622 as described in FIGS. 3 and 4. For clarity, the primary wireless connection link from mobile device 621 to a network inside cloud 620 is indicated by wireless connection 623. Note that some of the networks seen by wireless device 621 are also seen by device 611, as denoted by the cross-hatched area in the overlap of clouds 610 and 620. As a result, both device 611 and 621 may have information on these sets of networks in their respective local databases 612 and 622.

Mobile device 631 can detect the primary access networks contained in cloud 630 (shaded with diagonal striping), and will store connection information it discovers about those networks in its local database 632. Again, for clarity, the primary wireless connection between the mobile device 631 and the networks appearing in Cloud 630 is indicated by wireless connection 633.

As previously described, mobile devices 611, 621, and 631 are aware of their geographic location, and when updating their respective local databases 612, 622 and 632, store information not just about the network and network conditions, but also about their location at the time of attempting to use a network, and the date and time at which the respective mobile device tried the network.

In one or more embodiments, mobile devices 611, 621, 631 and 641 possess the ability to communicate with an alternative or secondary wireless communication technology, such as a signal out-of-band from the main wireless radio technology, in order to broadcast information about the network connection information contents of its local database to other mobile devices. This can be in the form of a beacon that other mobile devices in range can receive and interpret.

For example, mobile device 611 can use an alternate radio connection 614 to broadcast information about the contents of its local database 612 to mobile device 621 or other mobile devices. In this example, cloud 640 represents the alternate radio technology used for devices to signal out-of-band from the main radio technology. An example of such a technology would be Bluetooth, which is transmitted and received by a secondary, independent radio in the mobile device. This allows the mobile device to simultaneously be using the primary radio network, and providing out-of-band information on the knowledge it has of networks to other mobile devices within close range at the same time.

If mobile device 611 connects to a network in cloud 610 by connection 613 successfully, it can now update its local database 612. Mobile device 611 can also broadcast this success over a secondary wireless broadcast, where in this example secondary wireless broadcast 614 is shown as being received by mobile device 621. As mobile device 611 can see and has knowledge on the networks inside cloud 610, which are not visible to mobile device 621, which can only see networks inside cloud 620, device 621 can obtain success or failure information about networks from other wireless devices in range of the secondary wireless broadcast. In one or more embodiments, this secondary wireless broadcast can have a limited range, such as Bluetooth or the like, where since the information being broadcast in the secondary wireless broadcast is very local, it tends to be relevant to the user of wireless device 621 when they move location.

Information learned by mobile device 621, both through its primary connection 623 to a network inside cloud 620, and through a secondary update through it's secondary radio connection 614 from mobile device 611, can be used to update the network connection information stored locally in local database 622. Further, this information can now be shared with other mobile devices over a secondary wireless connection. In other words, mobile device 621 could in turn share the information it learned from mobile device 611 with another mobile device 631 via another secondary radio connection 634, together with other network connection information stored in local database 622 of mobile device 621.

Mobile device 631 would be using its primary wireless connection 633 to connect to a network in cloud 630, while at the same time it could be receiving information on networks outside of cloud 630 (e.g., information networks in clouds 620 and 610 as received from mobile device 621) through secondary radio connection 634. If mobile device 631 moved out of range of the networks in cloud 630, but moved in range of the networks in cloud 620, mobile device 631 would possess prior collected information about the networks in cloud 620 that would enable it to be able to connect more easily to a network in cloud 620 based on the information shared by client 621 over secondary link 634.

This technique of sharing content between mobile devices can be made to work for mobile devices that are further removed as well. For example, in FIG. 6, mobile device 641 is out of range of either of the primary radio technology networks in clouds 610, 620, and 630, but it is in range using a secondary wireless radio technology to mobile device 631. Thus, over secondary wireless link 644, mobile device 641 receives network information about networks in the primary clouds 610, 620 and 630, even though mobile device 641 may never have previously detected any networks appearing in the wireless ranges encompassed by these clouds.

Assuming mobile device 641 subsequently moves into the range of one of the networks in clouds 610, 620, or 630, mobile device 641 will now have a better indication of what network to connect to initially, thereby improving efficiency and saving connection time and battery power.

As previously described, in one or more embodiments, specific location information for each mobile device when connected to an access point is stored in its local database, where this information can be exchanged between mobile devices when they exchange network information. If mobile device 621 is capable of determining information about the primary network it's connected to (i.e., a network in cloud 620), and sends this information in its updates over secondary wireless link 634 to mobile device 631, the updates from mobile device 631 to mobile device 641 over secondary wireless link 644 would contain this location information. If mobile device 641 is not capable of determining its location, but comes in range of one of the access points reported by device 621 with approximate location information, mobile device 641 would now have a reasonably accurate location of where it is located. This provides a mechanism for a mobile device that is not equipped with a locator service, such as GPS, to provide an estimation of its location.

Figure 7:
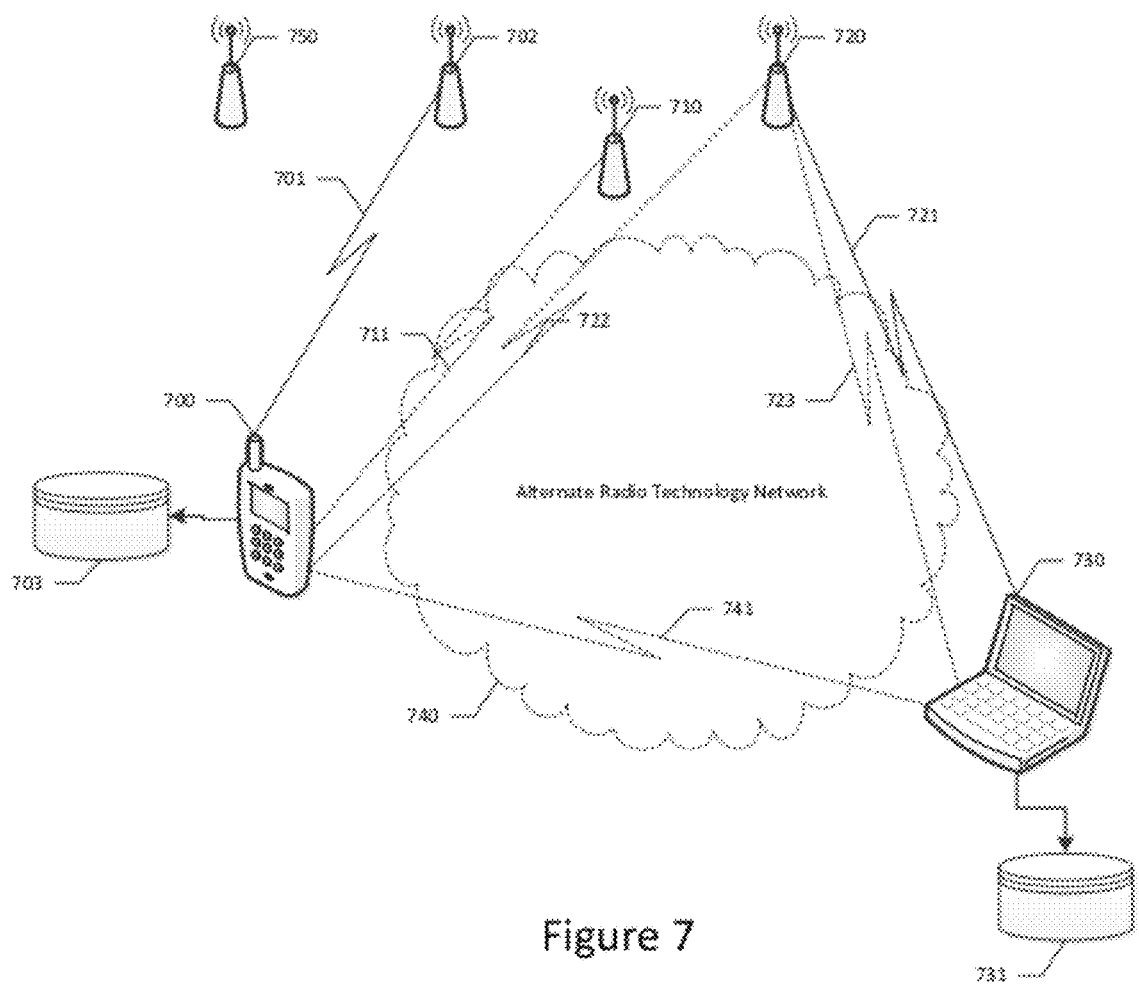
FIG. 7 is a block schematic diagram of various system components sharing network connection information with each other using a secondary wireless radio network by having the network access points themselves broadcast network connection information over the secondary wireless radio network, in accordance with one or more embodiments of the present disclosure.

Similarly, in one or more embodiments, a variation of the mobile devices sharing network connection information with each other using a secondary wireless radio network can be implemented by having the network access points themselves broadcast network connection information over the secondary wireless radio network, such as illustrated in the block schematic diagram of FIG. 7.

In FIG. 7, mobile device 700 is currently connected using primary wireless radio technology link 701 to wireless network 702, where information about the successful connection to network 702 is stored in the local database 703 of wireless device 700.

Primary network access point 710 may also be equipped with a secondary radio technology to perform secondary wireless radio broadcasts. While any radio technology pair can be used in combination, in this example, Wi-Fi 802.11 is used as the primary wireless technology and Bluetooth is used the secondary wireless radio technology. Cloud 740 illustrates the secondary radio network, where the secondary radio network and its connections (e.g., secondary wireless radio links 711, 722, 723 and 741) are illustrated by dashed lines to indicate this is a secondary radio access technology.

Using its secondary wireless radio, access point 710 may continuously, periodically or selectively beacon out connection information about itself to any mobile devices in range of the secondary wireless radio broadcasts. This beacon contains requisite parameters, such as the ESSID, login methodology, and conditions regarding the availability of the access point (e.g., whether it is available for free network access). In FIG. 7, the beacon signal 711 is received by mobile device 700, which can update local database 703 with availability information for this access point 710, even though it has never previously connected to it or previously received configuration information about the network associated with access point 710. As previous described, location information can be available in the beacon sent by the access point for access point 710, allowing for location determination based on access point visibility.

In one or more embodiments, access point 720 may be equipped with two radios, where access point 720 uses it's primary radio for primary wireless connection 721 to mobile device 730, which will store information about this connection in its local database 731. Access point 720 uses it's secondary radio for secondary wireless radio link 723 that also provides information to mobile device 730 about the connectivity available to the network through access point 720. Prior to establishing connection 721, mobile device 730 can use this network connectivity information for access point 720 it receives through secondary wireless radio link 723 to determine whether to connect to network 720 or to prefer another network.

As described in connection with FIG. 6, information between mobile devices 700 and 730 may also be exchanged when both mobile devices 700 and 730 are in range of the secondary radio technology (shown by cloud 740) through secondary wireless radio link 741. While mobile device 730 may not have direct knowledge about network 710 from any prior connection attempts, mobile device 730 can obtain this knowledge from mobile device 700 through secondary wireless radio link 741, since mobile device 700 obtained the network connectivity information from access point 710 through secondary wireless radio link 711, and subsequently shared this information with mobile device 730 using secondary wireless radio link 741.

As such, mobile device 730 benefits in that when it moves out of range of access point 720, but in range of access points 702, 710, and 750, mobile device 730 will be aware to attempt to use networks associated with access points 702 or 710 based on information it has obtained from mobile device 700, thus saving connection time and battery power.

In one or more embodiments, instead of the access point itself being equipped with a secondary radio to broadcast beacons with connection information about itself to any mobile devices in range of the secondary wireless radio broadcasts, a separate device containing secondary radio in the proximity of the access point could alternatively beacon out this information. For example, a separate Bluetooth-enabled radio could broadcast Bluetooth signals to local wireless devices with connection information about an access point, which is useful in providing such secondary radio beacons for access points not equipped with secondary radios to enable such secondary beacon transmission.

In one or more embodiments, a system, apparatus and method are provided that allow notifications to be provided to mobile devices about wireless networks that a mobile device should not use, even if the mobile device would otherwise have the capability of using such wireless networks to access the Internet. Such preventative uses could be implemented by various entities, such as at the request of the operator of an access point or the network infrastructure beyond that access point or another individual.

Figure 8:
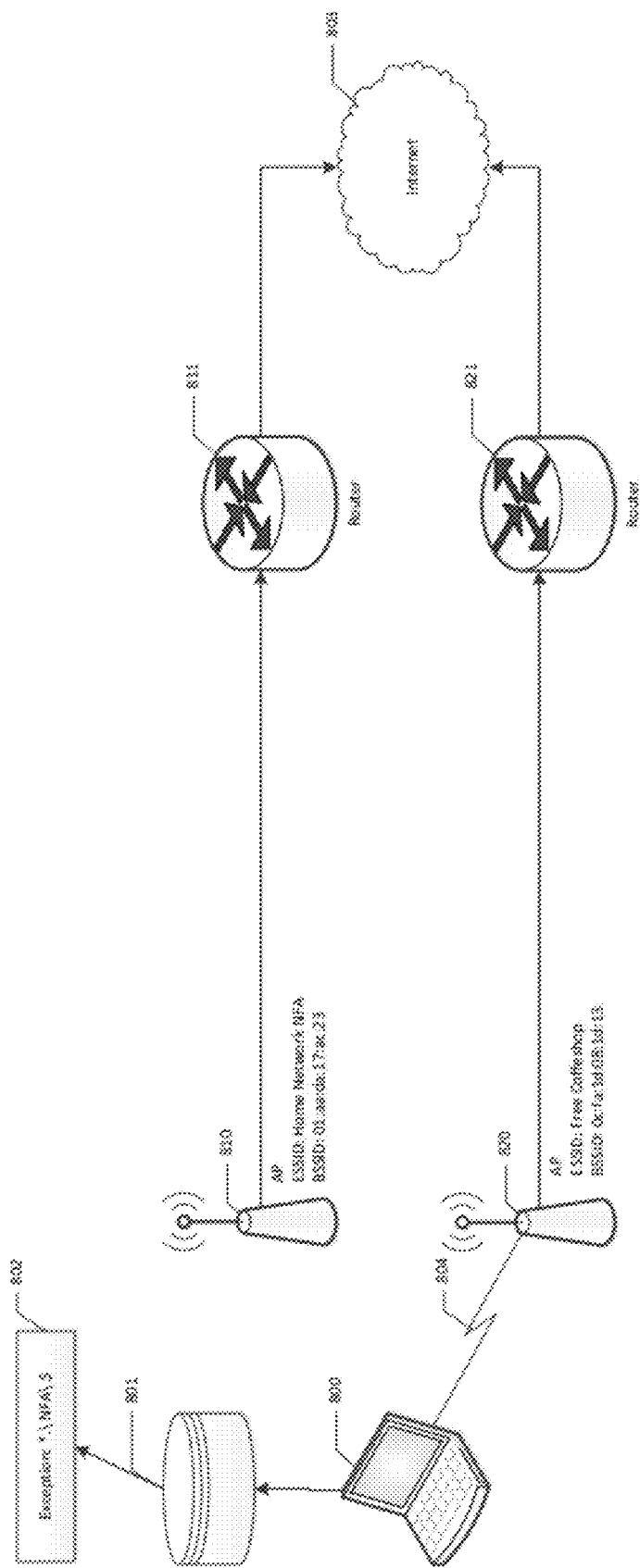
FIG. 8 is a block schematic diagram of a first exclusion method in accordance with one or more embodiments of the present disclosure in which the operator of a wireless network is able to decide whether a mobile device user should not be allowed to automatically access the wireless network.

Referring now to the block schematic illustration of FIG. 8, a scenario is depicted in accordance with one or more embodiments in which the operator of a wireless network is able to decide whether a mobile device user should not be allowed to automatically access the wireless network. The scenario shown here is specific to Wi-Fi (802.11) networking, however a similar technique can be adapted for use with any other wireless network type. Mobile device 800 runs a software client which is able to detect and connect to various wireless networks, as described herein. Database 801 is resident on mobile device 800 and contains configuration information for the software client running on the mobile device 800. In one or more embodiments, it is imperative that this database is local to the software client running on the mobile device 800, as information from the database is needed for this connection scenario.

In the configuration stored in database 801, certain information may be stored that identifies that a particular network should not be used. For example, information or a rule 802 may be stored in database 801 that identifies a particular network that should not be used. For example, an exception pattern part of a rule 802 may be stored in database 801. The software client running on mobile device 800 is configured to evaluate the exception pattern when it determines what networks it can and cannot use. In FIG. 8, the exception pattern is shown as a regular expression which matches any network names ending in a space (ASCII 32), followed by the letters NFA, followed by another space (ASCII 32) at the end of a network name (e.g., "Exception: *.\NFA\$"). This configuration is capable of being dynamically updated by the configuration server 344 shown in FIG. 3, so the exception pattern can be dynamically changed, extended, or removed. The use of a regular expression pattern is a powerful mechanism, since many networks can be excluded with a very small amount of configuration data. While a specific example of an exception pattern is provided to describe this embodiment, it is understood that any pattern could be used as appropriate for the particular wireless technology being employed (e.g., the pattern used for a 802.11 WiFi network could be different than the pattern used for other wireless technologies).

When mobile device 800 scans for available networks, it will detect network 810, with a network name of 'Home Network NFA' and network 820, with a name of "Free Coffeeshop." Either network 810 or 820 connects to the Internet 803, through respective routers 811 and 821, such that if it were not for a configuration by the network operator blocking usage by this mobile device 800, the software client on the mobile device 800 could pick either network to make its connection.

However, the network name of 'Home Network NFA' of network 810 falls within the exception pattern "Exception: *.\ NFA \ $" stored in rule 802, such that the software client on mobile device 800 knows that it is not supposed to use network 810. There are not similar restrictions placed on mobile device 800 by the network operator of network 820. As such, due to rule 802 stored in database 801, the software client on mobile device 800 will only connect to network 820 using wireless link 804, since a connection to network 810 is prohibited by rule 802.

Figure 9:
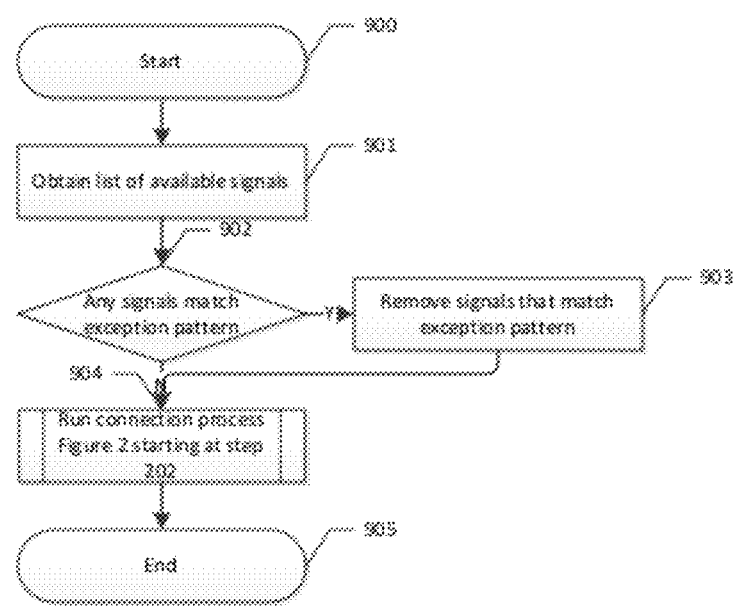
FIG. 9 is an operational flow diagram of FIG. 8 in accordance with one or more embodiments of the present disclosure.

Referring now to FIG. 9, a process flow diagram is illustrated for the modified connection process, as described in connection with FIG. 8, that identifies networks excluded from use when otherwise performing the connection processes described herein, such as in FIG. 2. For example, the operations described in connection with FIG. 9 could be performed in the embodiments associated therewith to replace operation 201 of FIG. 2.

Operation 900 starts the new connection process. In operation 901, the list of networks is obtained, as was similar done in the connection process of operation 201 of FIG. 2. With reference to the specific example of FIG. 8, the list of networks obtained would have been 'Home Network NFA' and 'Free Coffeeshop.'

In operation 902, the software client running on the mobile device checks if any networks in the network list from operation 901 match a stored exception pattern. In this case, network 'Home Network NFA' matches the criteria in exception pattern "Exception: *.\ NFA \ $" stored in rule 802. As a result, in operation 903, any networks that match a stored exception pattern, such as the network "Home Network NFA," is removed from the list of networks. If no networks in the networks list match a stored exception pattern, then no networks are removed from the list. The process flow then moves on to process 904, where the remainder of the connection process, as previously described in FIG. 2 starting with operation 202 is completed. As a result of this additional process, the software client running on the mobile device will not attempt to connect to a network it has been configured to not access, such as by restrictions from a network operator that have programmed into the configuration data sent to the mobile devices, as described in FIGS. 2 and 3.

Figure 10:
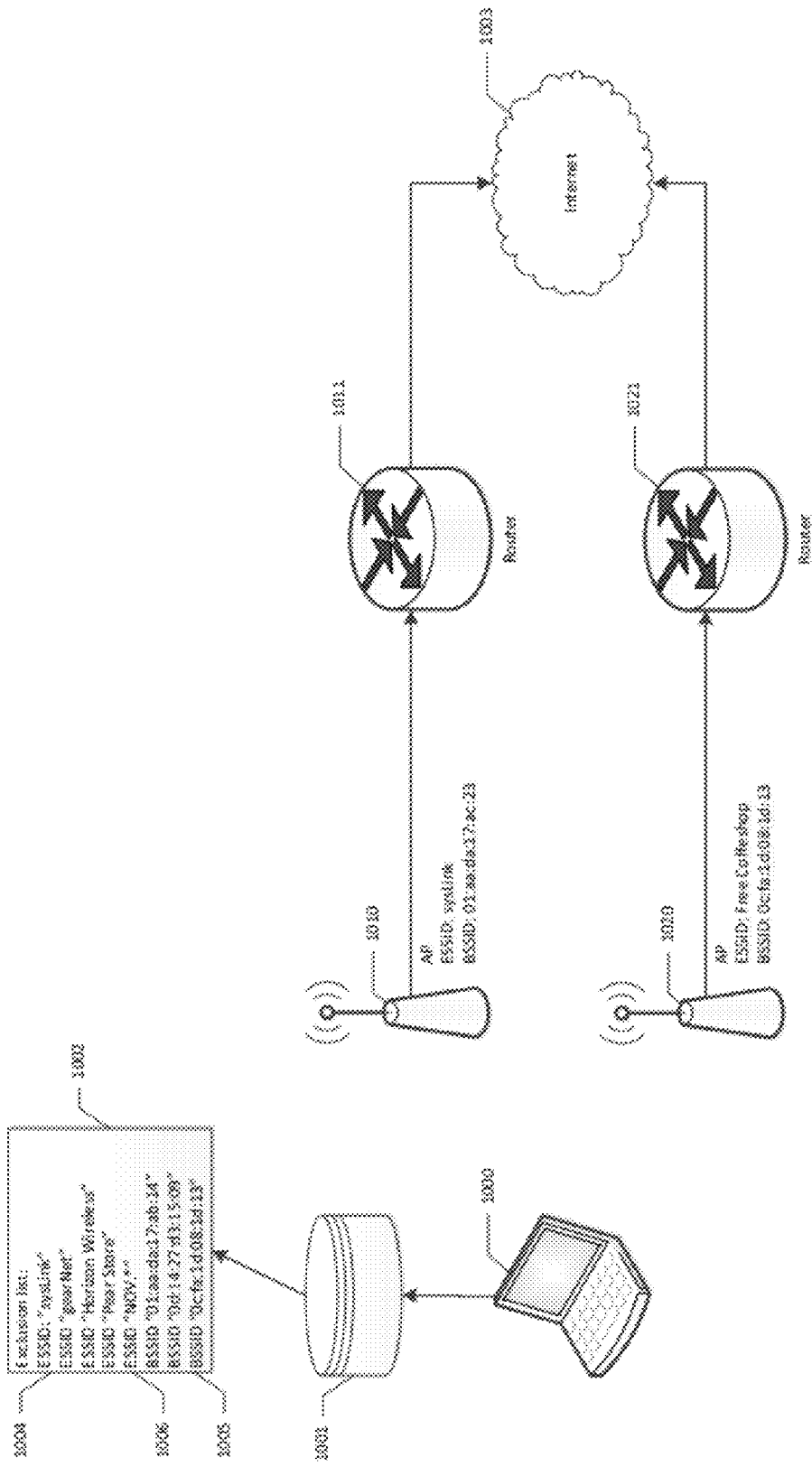
FIG. 10 is a block schematic diagram of a second exclusion method in accordance with one or more embodiments of the present disclosure in which the operator of a wireless network is able to decide whether a mobile device user should not be allowed to automatically access the wireless network.

Referring now to FIG. 10, a block schematic illustration of another scenario is depicted in accordance with one or more embodiments in which the operator of a wireless network is able to decide whether a mobile device user should not be allowed to automatically access the wireless network. In the embodiments associated with FIG. 10, the wireless network operator is able to contact the company providing service through the mobile device to provide network identifiers, where these identifiers are included in the configuration information sent to the various mobile devices. The scenario shown here is specific to Wi-Fi (802.11) networking, however a similar technique can be used for any other wireless network type.

Mobile device 1000 runs a software client which is able to detect and connect to various wireless networks, as described herein. Database 1001 is resident on mobile device 1000 and contains configuration information for the software client running on the mobile device 1000. In one or more embodiments, it is imperative that this database 1001 is local to the software client operating on mobile device 1000, as information from the database 1001 is needed for this connection scenario.

An exception table or exception list 1002 is stored in database 1001 that contains a list of wireless networks and access points that mobile device 1000 is excluded from being able to connect to. The software client running on mobile device 1000 will evaluate the exception list 1002 when it determines what networks it can and cannot use. In FIG. 10, the exception list 1002 is shown as containing both Wi-Fi (802.11) specific Network Names (ESSID) and Access Point hardware addresses (BSSID), but this technique is equally applicable to any other wireless technology using that technology's specific parameters and can contain appropriate respective identifiers. This configuration containing the exception list 1002 is dynamically updated by the configuration server 344. As such, the exception list 1002 can be dynamically changed, extended, or removed. The use of a of exception lists is a powerful mechanism, since it makes it possible to determine what networks to use or not use down to the individual network element, with a per-network-element granularity.

When mobile device 1000 scans for available networks, it will see wireless network 1010, with a network name of 'sysLink' and wireless network 1020, with a hardware address of 0c:fa:1d:08:1d:13. Either network 1010 or 1020 connects to the Internet 1003, through respective routers 1011 and 1021, and if it were not for these networks being excluded in the configuration of mobile device 1000, the software client for mobile device 1000 could pick either network to make its connection.

However, due to rule 1004 appearing in exception list 1002 in configuration database 1001, the software client on mobile device 1000 will not connect to network 1010 as the name of network 1010 matches exclusion list item 1004. Likewise, due to rule 1005 in exception list 1002 in configuration database 1001, the software client on mobile device 1000 will not connect to network 1020 as the hardware identifier of network 1020 matches exclusion list item 1005. As a result, mobile device 1000 will not attempt to connect to either network detected in FIG. 10. Further, in one or more embodiments, the exclusion concept introduced in connection with FIG. 8 can be combined with the concept introduced in FIG. 10, as shown by exclusion list item 1006 in exclusion list 1002.

Figure 11:
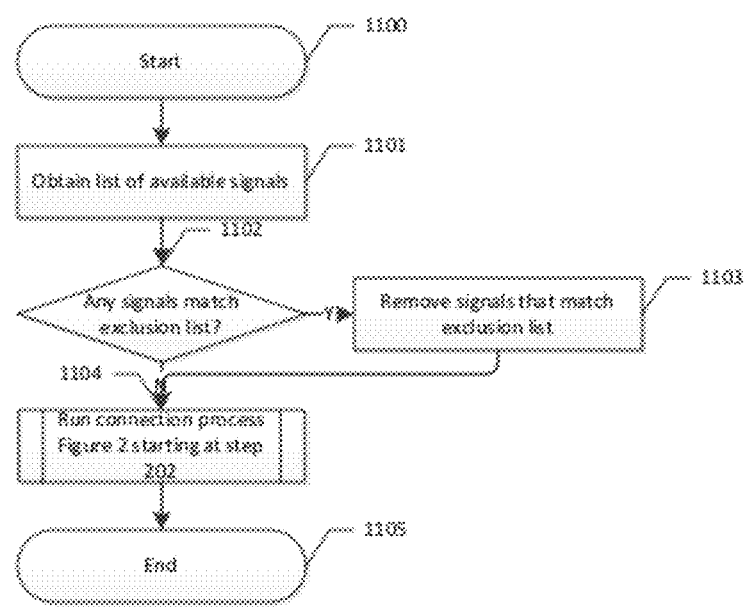
FIG. 11 is an operational flow diagram of FIG. 10 in accordance with one or more embodiments of the present disclosure.

FIG. 11 is a flow diagram for a portion of the connection process described in connection with FIG. 10 that slightly differs from the connection processes described in FIGS. 8 and 2, where the operations described in connection with FIGS. 10 and 11 could be performed in the embodiments associated therewith to replace operation 201 of FIG. 2.

Operation 1100 starts the new connection process. In operation 1101, the software client running on the mobile device (e.g., mobile device 1000) obtains the list of networks as was done in the connection process 201 in FIG. 2. In the example of FIG. 10, the network list obtained would have been 'sysLink' with a hardware address of "01:aa:da:17:ac:23" and 'Free Coffeeshop' with a network address of "0c:fa:1d:08:1d:13"

Operation 1102 is performed by the software client to check if any networks or hardware in the network list from operation 1101 match any item appearing in the stored exclusion list 1002. In this case, network 1010 having ESSID = 'sysLink' matches exclusion list item 1004 (ESSID: 'sysLink'), and network 1020 having an AP address of "0c:fa:1d:08:1d:13" matches the corresponding entry in exclusion list item 1005. As a result, the software client removes both networks 1010 and 1020 from the list of available signals in operation 1003. The process flow then moves on to operation 1004, where the remainder of the connection operations, as previously described in FIG. 2 starting with operation 202 are completed. In the example illustrated in FIG. 10, the mobile device 1000 will not attempt to connect to either network 1010 or 1020, as they both appear in the exclusion list 1002 and mobile device 1000 should not access to either one of them.

Figure 12:
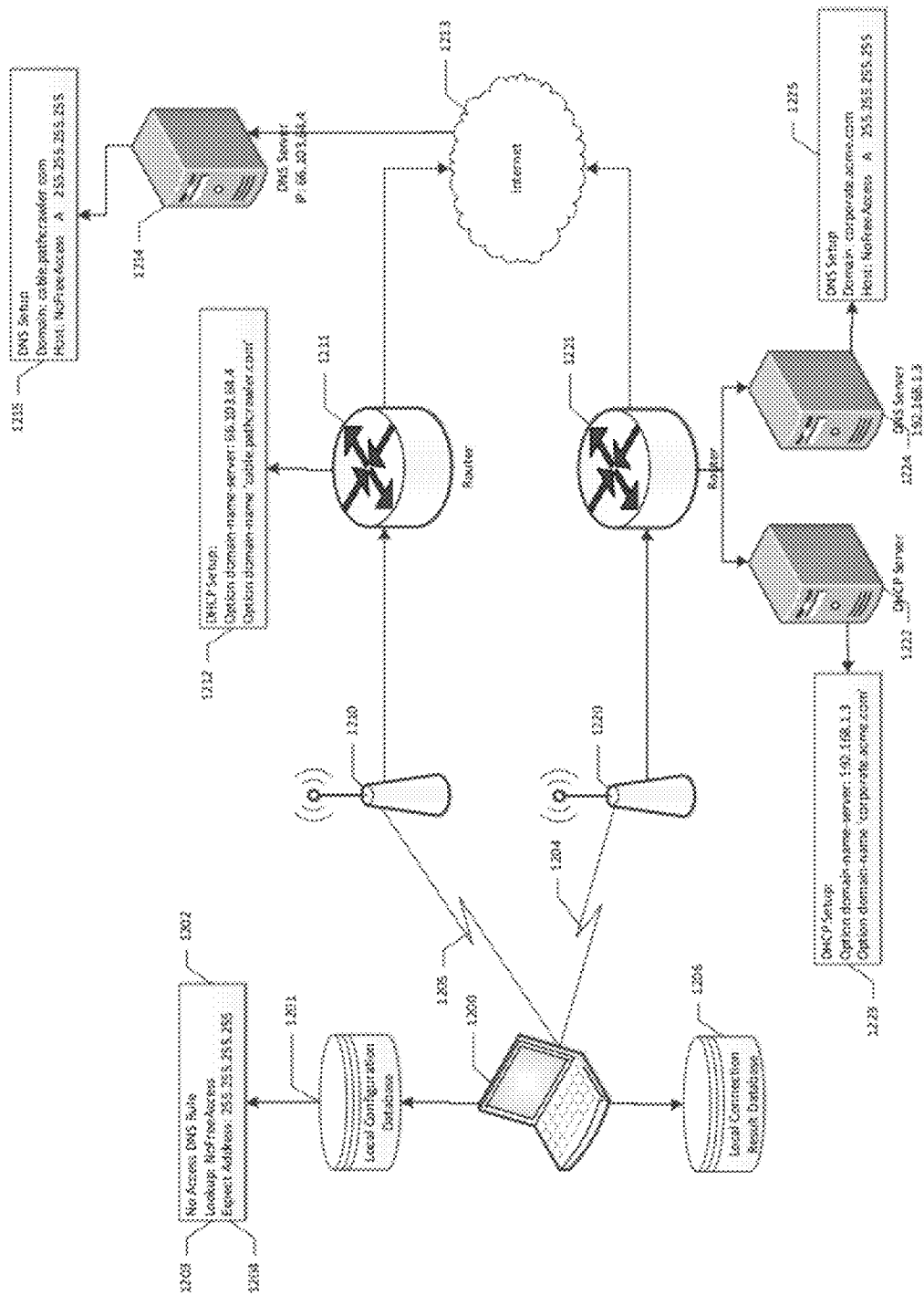
FIG. 12 is a block schematic diagram of a third exclusion method in accordance with one or more embodiments of the present disclosure in which a party operating the domain name server, either on the local network, or on any upstream network from the local network, can control network access.

Referring now to FIG. 12, a block schematic illustration of another scenario is depicted in accordance with one or more embodiments in which the operator of a wireless network is able to decide whether a mobile device user should not be allowed to automatically access the wireless network without requiring any changes to the network hardware providing the wireless signal, and further not requiring the operator of the network to coordinate with the company controlling the mobile wireless device. Rather, the party operating the domain name server, either on the local network, or on any upstream network from the local network, can control network access. The scenario shown here is specific to Wi-Fi (802.11) networking, however a similar technique can be used for any other wireless network type.

In one or more embodiments in which the domain name server (DNS) can be used to exclude network access, mobile device 1200 runs a software client which is able to detect and connect to various wireless networks. Initially, mobile device 1200 will connect with link 1205 to network 1210, after first checking local configuration database 1201 and local connection results database 1206 and finding no restrictions exist for this network. In one or more embodiments, local configuration database 1201 and local connection results database 1206 may comprise separate databases, where in other embodiments local configuration database 1201 and local connection results database 1206 may comprise different content stored in different respective portions of a single local database. Thus, in other embodiments described in connection with other the Figures of this application in which only a single local database is described and depicted for each mobile device, it is understood that such single local databases may comprise one or more databases that correspond to local configuration database 1201 and local connection results database 1206.

Upon establishment of a connection 1205 between mobile device 1200 and network 1210, mobile device 1200 will obtain a dynamically assigned network address using DHCP from a DHCP server, where for network 1210 the role of the DNS server is handled by router 1211. Router 1211 consults a stored local configuration 1212, and provides an IP address to mobile device 1200, and further includes in the DHCP response the address of the domain name server to use, and the default domain to use when making domain name service requests with unqualified host names, both of which are shown in configuration 1212.

The software client on mobile device 1200, after having received the valid IP address, consults local configuration database 1201, and retrieves configuration rule 1202 associated with a stored DNS it is not permitted to use. In this manner, in one or more embodiments, the company operating the mobile device 1200 can make and publish a rule for use by network operators that lets them choose whether a certain company's mobile devices should not have access to their network by allowing them to simply put in this DNS entry. Subsequently, the network operator does not have to interact with the company operating the mobile device and software client to restrict access, nor does the network operator have to make any network changes.

Combining the Lookup attribute 1203 specified in the retrieved configuration rule 1202 and the Domain Name attributes provided in the DHCP response, the software client running on mobile device 1200 now constructs a DNS request for the name 'NoFreeAccess.cable.pathcrawler.com', and sends this DNS request to the address of the DNS server 1214 that was also provided in the DHCP response. As specified in the DHCP response per configuration 1212, the software client running on mobile device 1200 consults with DNS server 1214, through the Internet 1213.

Domain Name Server 1214 receives the DNS request, and answers according to its configuration in 1215 with an address (A) response of 255.255.255.255, where this response is sent back to mobile device 1201. The software client running on mobile device 1200 compares the response received with the expected response portion of its local configuration 1202, which is shown as expected address 1204. Since the information returned matched the expected information, this indicates to the software client that this network 1210 should not be used. The software client disconnects network connection 1205 immediately, and updates local connection results database 1206 with the requisite parameters for this network, and marks it as unusable. As described in previous figures, this will ensure the connection to this network 1210 will not be re-tried in the future.

This first example associated with FIG. 12 shows how an upstream network provider can prevent downstream networks from making free access available through their network. In this example, cable broadband provider 'pathcrawler' can make one entry in its DNS server to ensure that none of its customers will be providing free access over their network to mobile devices that are not authorized for such free access (i.e., those mobile devices having a "No Access DNS Rule" that matches the cable broadband provider's entry in its DNS server).

In one or more embodiments, a local network administrator can additional ensure that unauthorized or undesired mobile devices will not attempt to connect to its wireless network, as further illustrated in the FIG. 12 in connection with network 1220. Upon being unable to connect to network 1210, mobile device 1200 will next attempt to establish a connection 1204 with wireless network 1220.

Upon establishing the connection 1204, mobile device 1200 will once again attempt to obtain an IP address using DHCP. In this embodiment, DHCP server 1222 will respond to the DHCP request, providing configuration information shown in configuration 1223. As before, the software client running on mobile device 1200 will consult configuration database 1201, obtain configuration rule 1202, and construct a DNS (Domain Name Service) query by combining request item 1203 with the information received in the DHCP response according to configuration 1223. The software client on mobile device 1200 will now make a DNS request for 'NoFreeAccess.corporate.acme.com' and send this request to DNS server 1224. DNS server 1224 will consult configuration 1225, and find the response for name 'NoFreeAccess.corporate.acme.com' is 255.255.255.255, and send this response back to mobile device 1200.

The software client running on mobile device 1200 will compare this response to the expected address 1204 of configuration rule 1202 stored in local configuration database 1201, and determine that the answer matches, meaning that the mobile device 1200 should not use this network 1220. Wireless connection link 1204 is then immediately severed, and Local Connection Result Database 1206 is updated with the requisite network parameters as previously described, including the information indicating this network 1220 should not be accessed. This database 1206 is consulted at the start of subsequent connection attempts, ensuring that the mobile device 1200 will not attempt to connect to this network 1220 in the future.

Note that in this second example of restricting network access in FIG. 12, the domain name server 1224 and DHCP server 1222 were controlled by a network administrator of the network 1220 directly connected to by the mobile device 1200, providing yet another level of granular control for keeping mobile devices from connecting to networks that do not intend to be open. While the DHCP server 1222 and domain name server 1224 are described and shown as separate components in communication with one another, it is understood that these components and their associated functionality could be combined together into the same component or server or further divided into yet even further components.

Figure 13:
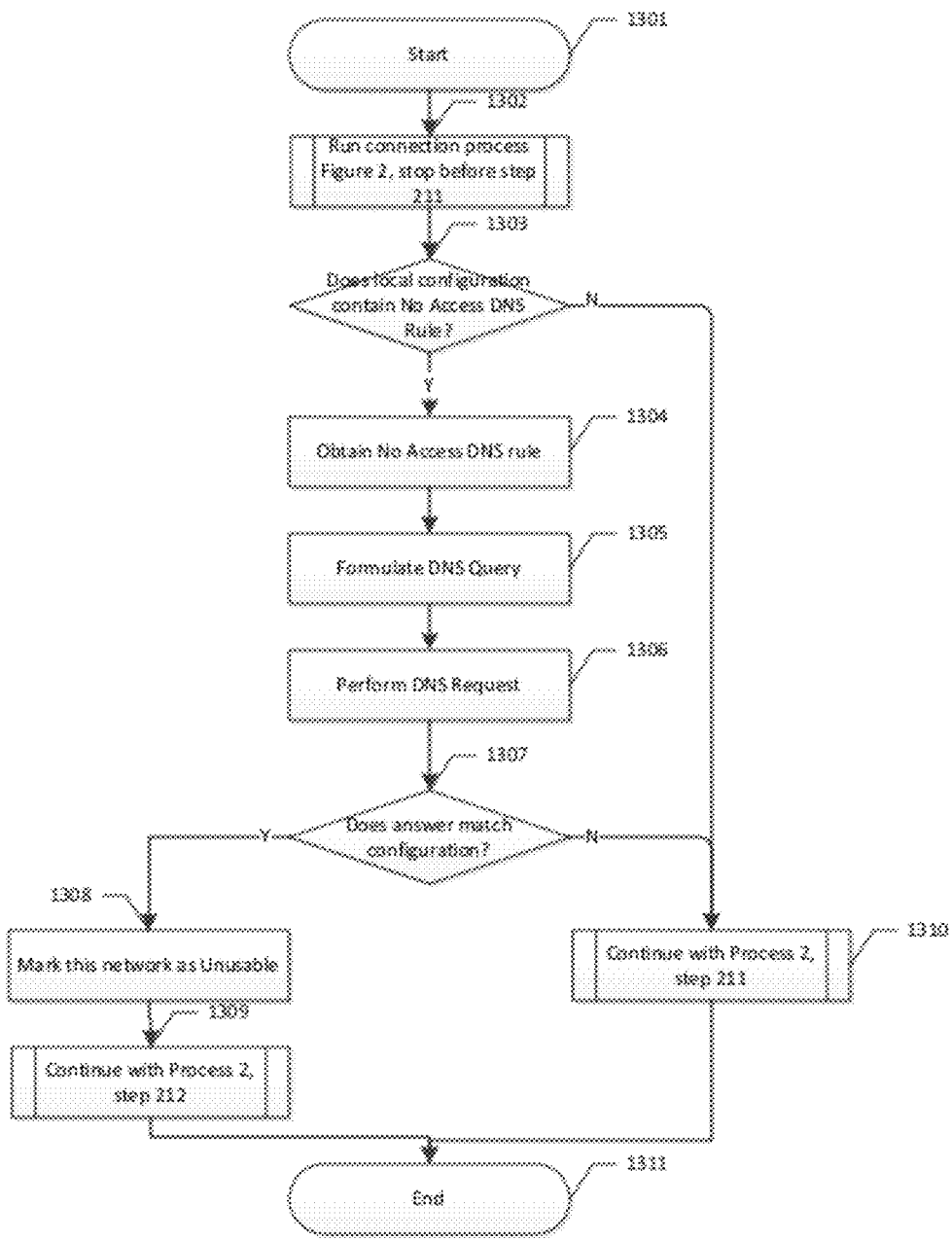
FIG. 13 is an operational flow diagram of FIG. 12 in accordance with one or more embodiments of the present disclosure.

Referring now to FIG. 13, a flow diagram for a portion of the connection process described in connection with one or more embodiments of FIG. 12 is illustrated that differs from the connection process described in previous figures. Operation 1301 starts the new connection process, where the software client in operation 1302 executes the connection process as described in FIG. 2 up to the operation preceding operation 211. In operation 1303, the software client determines if a DNS exception configuration rule exists (i.e., whether a "No Access DNS Rule" exists), by examining client local configuration 1202 as described in connection with FIG. 12. If no such rule exists, the process continues to operation 1310 where execution of the process in FIG. 2 continues at operation 211.

If a DNS Exception Configuration exists, the contents of the DNS Exception rule is retrieved from configuration 1202 in operation 1304. The DNS query is next formulated in operation 1305 by taking the lookup portion of the DNS rule as described in FIG. 12, and combining it with the domain name from the DHCP response, as also described in connection with FIG. 12. The DNS request is executed in operation 1306, and a determination is made in operation 1307 by comparing the expected answer to the response portion of the DNS exclusion rule as described in FIG. 12. If a match is found, this network as unusable in operation 1308. At operation 1309, the connection process of FIG. 2 then continues from its operation 212, resulting in an update to the local database with this information.

If a match is not found, the connection process is continued by operation 1310 as described in FIG. 2 at operation 211. Operation 1311 completes the process associated with the embodiments of FIG. 13.

Figure 14:
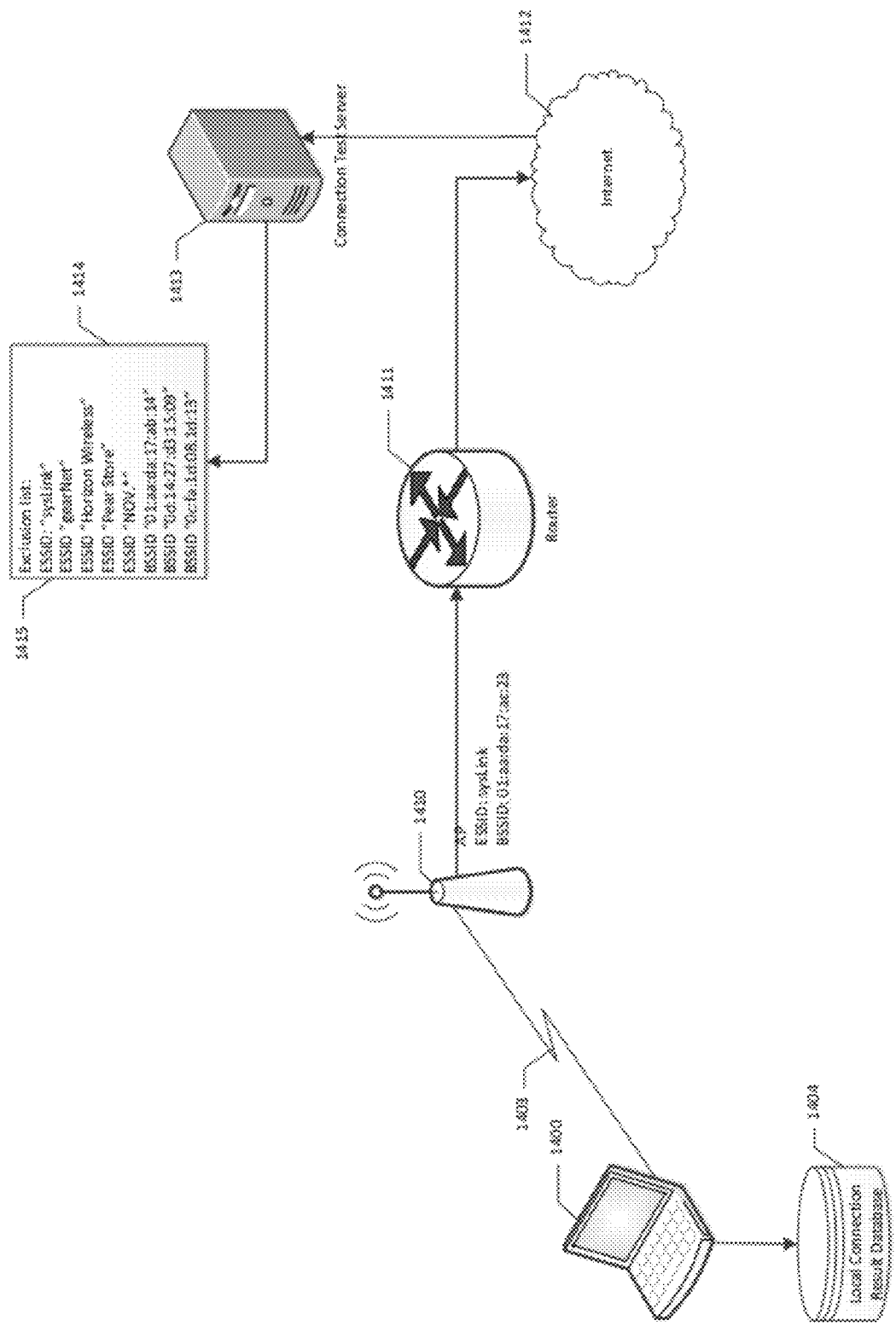
FIG. 14 is a block schematic diagram of a fourth exclusion method in accordance with one or more embodiments of the present disclosure in which a network exclusion list is maintained on a central server.

Referring now to FIG. 14, yet another possibility of network exclusion is illustrated in a block schematic diagram that is similar to the exclusion method shown in FIG. 10, except that the exclusion list is not maintained on the mobile device, rather it is maintained on a central server (e.g., connection test server 1413). The network operator for network 1410 provides the operator of connection test server 1413 with the requisite information on network 1410 for inclusion in the server based list. The scenario shown here is specific to Wi-Fi (802.11) networking, however a similar technique can be used for any other wireless network type.

In accordance with one or more embodiments associated with FIG. 14, mobile device 1400 runs a software client which is able to detect and connect to various wireless networks, as described herein. As described in connection with FIG. 2 and other previous figures, the mobile device 1400 establishes connection 1403 with mobile network 1410. Upon completion of the connection 1403, the software client on mobile device 1400 is configured to connect though router 1411 and the Internet 1412 to connection test server 1413. It reports to connection test server 1413 the requisite information about network 1410.

Connection test server 1413 performs a lookup in its local exclusion list 1414 to determine whether any entries correspond to the connection test received from mobile device 1400. In this instance, connection test server 1413 finds a match on entry 1415 for ESSID: "sysLink" in the exclusion list, which indicates mobile client 1400 should not access network 1410 having the ESSID "sysLink." Connection test server 1413 then sends a response to mobile device 1400 indicating that this network 1410 should not be used, where mobile device 1400 severs connection 1403 and updates local connection result database 1404 with information about network 1410, indicating this network 1410 cannot be used for future connections.

As previously described, this entry in the local database 1404 maintained by the software client on mobile device 1400 will ensure the mobile device 1400 will not attempt to connect to this network 1410 in the future. No separate flow diagram is provided for this drawing, as the flow diagram in FIG. 2 accurate covers this scenario, since the connection test server 1413 function is extended to provide this functionality.

Figure 15:
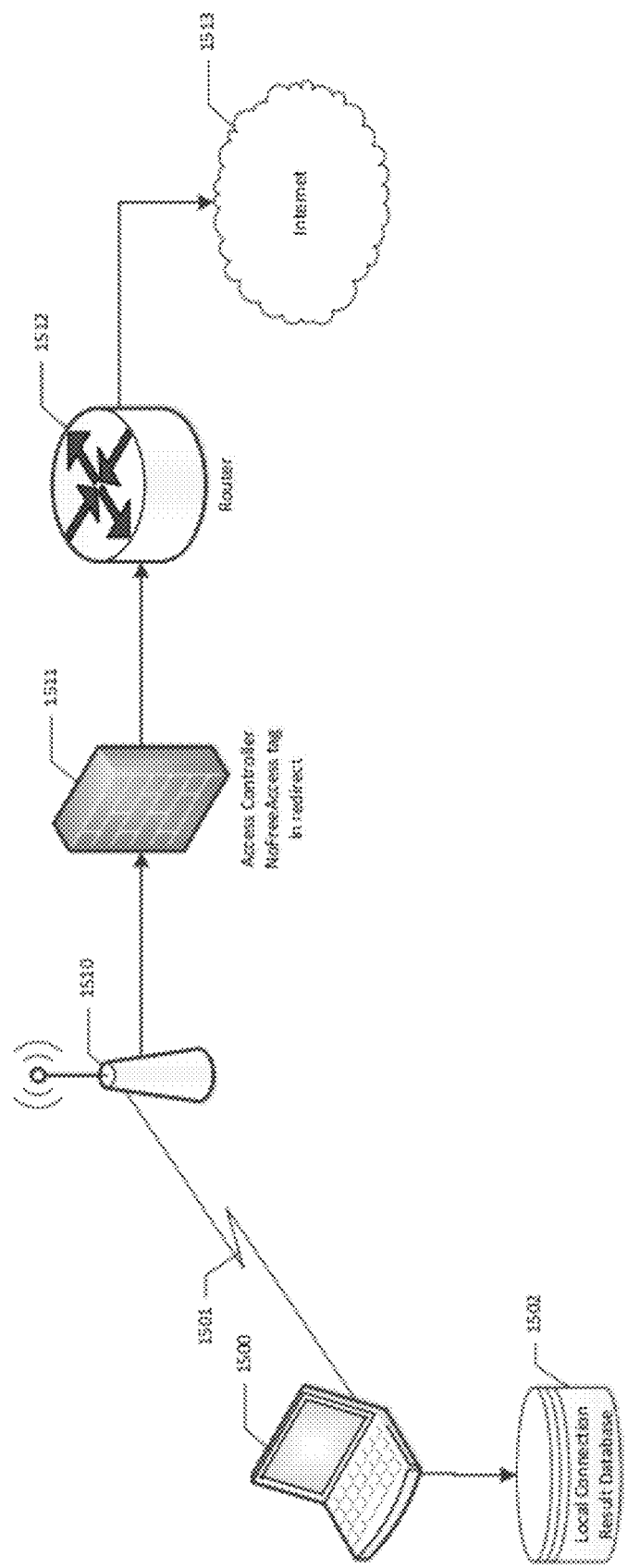
FIG. 15 is a block schematic diagram of a fifth exclusion method in accordance with one or more embodiments of the present disclosure in which the operator of the access controller on the wireless network can indicate to the mobile device that it should not connect to this network and bypass any forced content shown to people connecting to this network.

FIG. 15 shows a schematic block diagram associated with a fifth method of exclusion, in which the operator of the access controller on the wireless network can indicate to the mobile device that it should not connect to this network and bypass any forced content shown to people connecting to this network. The network used can be of any technology; while a wireless connection is shown in this example, a similar approach will work for any type of network.

Mobile device 1500 establishes connection 1501 to network 1510. As described in FIGS. 1 and 2, when attempting to connect to the internet 1513, the request made by the software client on mobile device 1500 is intercepted by access controller 1511. This request is in the form of an HTTP request, and access controller 1511 will intercept this request and issues a re-direct command to the requesting software client running on mobile device 1500, with the redirect pointing to web content available on the access controller 1511.

Either as part of this redirect request, or as part of the content returned, access controller 1511 will return a tag in the page or the page header (e.g.,. one that is of the form <NoFreeAccess />). The software client running on mobile device 1500 will understand this tag to mean that no free access is to be provided on this network 1510. It will subsequently sever network connection 1501, and update local connection results database 1502 with information on network 1510 and its unsuitability for use. As previously described, this will result in the software client not attempting to connect t this network 1510 in the future. This detection process will happen as part of operation 210 in FIG. 2; as such no separate flow diagram has been provided.

Figure 16:
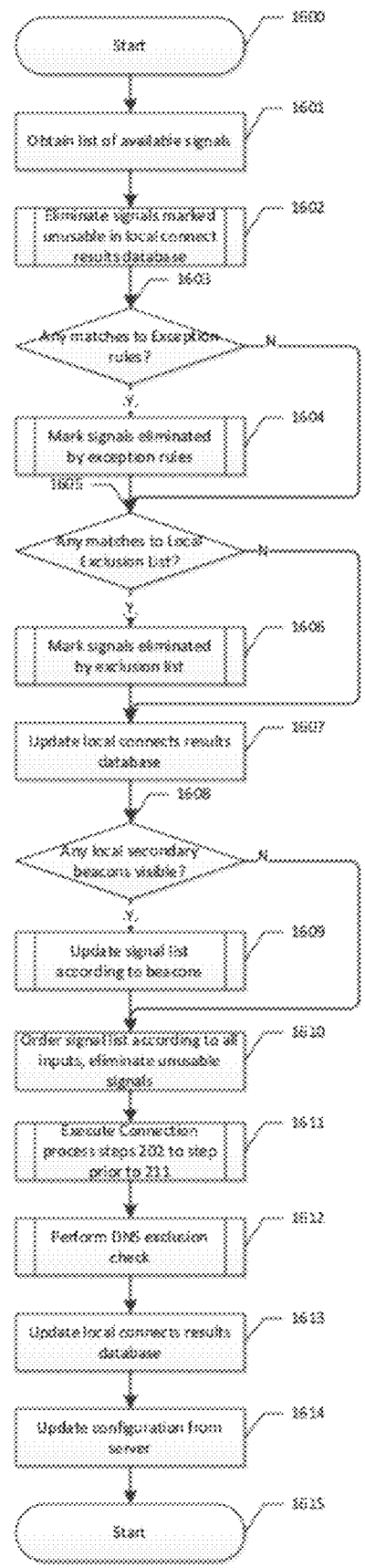
FIG. 16 is an operational flow diagram in accordance with one or more embodiments illustrating the manner in which the various methodologies for connection information sharing and network exclusion can be combined in a single, cohesive process.

Referring now to FIG. 16, an operational flow diagram is provided in accordance with one or more embodiments illustrating the manner in which the various methodologies for connection information sharing and network exclusion described in FIGS. 3 through 15 can be combined in a single, cohesive process which results in an effective and fast method of selecting a network a mobile device can use from a plurality of available networks that were not pre-configured.

The process starts in operation 1600. In operation 1601, the mobile device obtains a list of all networks it can connect to, in the same fashion as described in FIG. 2. In operation 1602, signals are eliminated and ranked based on the historical connection information already available to the device in its local connection results database, as described herein in connection with embodiments shown in previous figures. In operation 1603, the mobile device determines if any exception rules exist in the stored configuration, such as described in connection with FIGS. 8 and 9. If any such signals do exist, they are marked as unusable in operation 1604, as previously described in connection with FIGS. 8 and 9.

The mobile device in operation 1605 then checks if any signals match entries in a local exclusion list, as described in connection with FIGS. 10 and 11, and if so, in operation 1606 these signals are marked in the list as unusable, again as described in connection with FIGS. 10 and 11.

The newly marked up list was updated based on highly reliable configuration data obtained from the configuration server 344, so this list is committed to the locally stored connection results database in operation 1607.

In operation 1608, the mobile device then checks for any local beacon information via secondary wireless radio broadcasts, as described in connection with FIGS. 6 and 7. If any such information exists, the network list is updated according to this information in operation 1609. In one or more embodiments, the network list is updated but the locally stored connection results database is not updated, as the network access information learned from local beacon information may not have been shown to be as reliable as the other network access information stored therein.

All available pre-connection information is now incorporated in the available signal list, and in operation 1610 the list is now sorted according to all input parameters, with the signals with the highest likelihood of establishing a network connection and Internet connection being put at that top of the list. Also, any signal marked as unusable is removed from the list at this point, resulting in a list containing only signals that are potentially usable in order of the likelihood of establishing a usable connection. All available inputs are taken into account in this ranking, i.e. configuration, local connection results database, beacon information, signal strength, etc.

In operation 1611, the connection process previously described in FIGS. 1 and 2 is now executed from operation 202 to the operation prior to operation 211. Note that the connection based server exclusion list process, such as described in connection with FIG. 14, and the access gateway tag exclusion process, such as described in connection with FIG. 15, are implicitly carried out in the process described in FIG. 2.

Subsequently, in operation 1612, the DNS based exclusion process as described in connection with FIGS. 12 and 13 is carried out. Although not shown in FIG. 16, the operations 1611-1613 are repeated for each available signal until a usable signal is found and wireless network connection established. In operation 1613, the local connection results database is updated, and sent to the collection server 340. As described in connection with FIGS. 3-5, this data is processed by the aggregation server 342 and made available to the configuration server 344.

In operation 1614, the software client running on the mobile device obtains a new set of configuration data; this data will include any learning from its local connection attempts, but also that of connection attempts made by software clients operating on other mobile devices, in effect producing a distributed, self-learning network access system.

In one or more embodiments, the software client installed on and operating on the mobile device as well as the functionality provided by the various server components (e.g., connection test server 105, collection server 340, aggregation server 342 configuration server 344) may be implemented in software, stored on a computer readable medium or computer readable storage medium, such as a memory of the respective device, where the memory may store computer readable instructions, e.g., program code, that can be executed by a processor or controller in a device (e.g., mobile device or personal computer) to carry out one or more of the techniques described herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor. In one or more embodiments, the actions and/or events of a method, algorithm or module may reside as one or any combination or set of codes and/or instructions on a computer readable medium or machine readable medium, which may be incorporated into a computer program product.

While the system and method have been described in terms of what are presently considered to be specific embodiments, the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method for dynamic wireless network discovery comprising:
   connecting a mobile device through an available wireless network to a remote connection test server;
   updating wireless network configuration information stored in a configuration database local to the mobile device with information obtained from the connection to the connection test server;
   transmitting the updated local wireless network configuration information to a centralized server database that aggregates wireless network configuration information received from a plurality of mobile devices;
   generating modified wireless network configuration information at the centralized server for one or more wireless networks based on the aggregated wireless network configuration information;
   transmitting the modified wireless network configuration information from the centralized server to one or more mobile devices;
   updating the wireless network configuration information stored locally in the one or more mobile devices using the modified wireless network configuration information received from the centralized server;
   wherein for each wireless network the step of generating modified wireless network configuration information at the centralized server further comprises:
      limiting the updated local wireless network configuration information received from each mobile device for each wireless network to a desired geographic region;
      determining whether wireless network configuration information has been previously stored at the centralized server for the wireless network and, if previously stored, updating the wireless network information with the local wireless network configuration information received from each mobile device;
      applying one or more business rules to the wireless network configuration information for the wireless network in order to characterize the wireless network and generate the modified wireless network configuration information; and
      if the characterized wireless network meets predetermined configuration requirements, storing the generated modified wireless network configuration information for the wireless network at the centralized server for distribution to the one or more mobile devices.

2. The method of claim 1, wherein prior to connecting the mobile device to the remote connection test server through the available wireless network, the method further comprising:
obtaining a list of wireless network signals available to a mobile device;
comparing the available wireless network signals against wireless network configuration information stored in the local configuration database;
updating stored wireless network configuration information with information obtained by the mobile device with respect to the available wireless network signals;
ranking the available wireless network signals based on the stored wireless network configuration information; and
selecting an available wireless network signal having a desired ranking for the mobile device to utilize in establishing a connection to its corresponding wireless network.

3. The method of claim 2, further comprising determining whether the selected available wireless network signal having the desired ranking has been designated as a signal that should not be used.

4. The method of claim 3, wherein if the selected available wireless network signal is designated as one that should not be used, the method further comprising selecting another available wireless network signal with a next most desirous ranking to utilize in establishing a connection to its corresponding wireless network.

5. The method of claim 3, wherein if the selected available wireless network signal is designated as one that should not be used, the method further comprising removing the wireless network signal from the list of available wireless network signals.

6. The method of claim 2, further comprising:
determining whether specific connection instructions for the wireless network associated with the selected available wireless network signal are stored in the local configuration database;
when such connection instructions specific to the selected available wireless network signal are stored in the local configuration database, using the stored connection instructions to connect to the corresponding wireless network; and
when connection instructions specific to the selected available wireless network signal are not stored in the local configuration database, using predetermined general connection instructions to connect to the corresponding wireless network.

7. The method of claim 1, further comprising:
receiving wireless network configuration information for one or more wireless networks at the mobile device transmitted from one or more other mobile devices; and
updating wireless network configuration information stored in the configuration database local to the mobile device with the wireless network configuration information received from the other mobile devices.

8. The method of claim 1, further comprising:
receiving wireless network configuration information for one or more wireless networks at the mobile device transmitted from one or more access points; and
updating wireless network configuration information stored in the configuration database local to the mobile device with the wireless network configuration information received from the one or more access points.

9. The method of claim 2, further comprising:
determining whether a network identifier associated with an available wireless network signal corresponds to a wireless network contained in an excluded list of wireless networks stored in the local configuration database; and
preventing the mobile device from attempting to connect to wireless networks having network identifiers that are present in the excluded list of wireless networks.

10. A system for dynamic wireless network discovery comprising:
means for connecting a mobile device through an available wireless network to a remote connection test server;
means for updating wireless network configuration information stored in a configuration database local to the mobile device with information obtained from the connection to the connection test server;
means for transmitting the updated local wireless network configuration information to a centralized server database that aggregates wireless network configuration information received from a plurality of mobile devices;
means for generating modified wireless network configuration information at the centralized server for one or more wireless networks based on the aggregated wireless network configuration information;
means for transmitting the modified wireless network configuration information from the centralized server to one or more mobile devices;
means for updating the wireless network configuration information stored locally in the one or more mobile devices using the modified wireless network configuration information received from the centralized server;
wherein the means for generating modified wireless network configuration information at the centralized server further comprises, for each wireless network;
means for limiting the updated local wireless network configuration information received from each mobile device for each wireless network to a desired geographic region;
means for determining whether wireless network configuration information has been previously stored at the centralized server for wireless network and, if previously stored, updating the wireless network configuration information with the local wireless network configuration information received from each mobile device;
means for applying one or more business rules to the wireless network configuration information for the wireless network in order to characterize the wireless and generate the modified wireless network configuration; and
means for storing the, generated modified wireless network configuration information for the wireless network at the centralized server for distribution to the one or more mobile devices if the characterized wireless network meets predetermined configuration requirements.

11. The system of claim 10, further comprising:
means for obtaining a list of wireless network signals available to a mobile device prior to connecting the mobile device to the remote connection test server through the available wireless network;
means for comparing the available wireless network signals against wireless network configuration information stored in the local configuration database;

means for updating stored wireless network configuration information with information obtained by the mobile device with respect to the available wireless network signals;

means for ranking the available wireless network signals based on the stored wireless network configuration information; and means for selecting an available wireless network signal having a desired ranking for the mobile device to utilize in establishing a connection to its corresponding wireless network.

12. The system of claim 11, further comprising means for determining whether the selected available wireless network signal having the desired ranking has been designated as a signal that should not be used.

13. The system of claim 12, further comprising means for selecting another available wireless network signal with a next most desirous ranking to utilize in establishing a connection to its corresponding wireless network, if the selected available wireless network signal is designated as one that should not be used.

14. The system of claim 12, further comprising means for removing the wireless network signal from the list of available wireless network signals, if the selected available wireless network signal is designated as one that should not be used.

15. The system of claim 11, further comprising:

means for determining whether specific connection instructions for the wireless network associated with the selected available wireless network signal are stored in the local configuration database;

means for using the stored connection instructions to connect to the corresponding wireless network when such connection instructions specific to the selected available wireless network signal are stored in the local configuration database; and means for using predetermined general connection instructions to connect to the corresponding wireless network when connection instructions specific to the selected available wireless network signal are not stored in the local configuration database.

16. The system of claim 10, further comprising:

means for receiving wireless network configuration information for one or more wireless networks at the mobile device transmitted from one or more other mobile devices; and means for updating wireless network configuration information stored in the configuration database local to the mobile device with the wireless network configuration information received from the other mobile devices.

17. The system of claim 10, further comprising:

means for receiving wireless network configuration information for one or more wireless networks at the mobile device transmitted from one or more access points; and means for updating wireless network configuration information stored in the configuration database local. to the mobile device with the wireless network configuration information received from the one or more access points.

18. The system of claim 11, further comprising:

means for determining whether a network. identifier associated with an available wireless network signal corresponds to a wireless network contained in an excluded list of wireless networks stored in the local configuration database; and means for preventing the mobile device from attempting to connect to wireless networks having network identifiers that are present in the excluded list of wireless networks.

19. A method for dynamic wireless network discovery comprising:

connecting a mobile device through an available wireless network to a remote connection test server;

updating wireless network configuration information stored in a configuration database local. to the mobile device with information obtained from the connection to the connection test server;

transmitting the updated local wireless network configuration information to a centralized server database that aggregates wireless network configuration information received from a plurality of mobile devices;

generating modified wireless network configuration information at the centralized server for one or more wireless networks based on the aggregated wireless network configuration information;

transmitting the modified wireless network configuration information from the centralized server to one or more mobile devices; and updating the wireless network configuration information stored locally in the one or more mobile devices using the modified wireless network configuration information received from the centralized server;

wherein prior to connecting the mobile device to the remote connection test server through the available wireless network, the following steps are performed:

obtaining a list of wireless network signals available to a mobile device;

comparing the available wireless network signals against wireless network configuration information stored in the local configuration database;

updating stored wireless network configuration information with information obtained by the mobile device with respect to the available wireless network signals;

ranking the available wireless network signals based on the stored wireless network configuration information; and selecting an available wireless network. signal having a desired ranking for the mobile device to utilize in establishing a connection to its corresponding wireless network.

20. A system for dynamic wireless network discovery comprising:

means for connecting a. mobile device through an available wireless network to a remote connection test server;

means for updating wireless network configuration information stored in a configuration database local to the mobile device with information obtained from the connection to the connection test server;

means for transmitting the updated local wireless network configuration information to a centralized server database that aggregates wireless network configuration information received from a plurality of mobile devices;

means for generating modified wireless network configuration information at the centralized server for one or more wireless networks based on the aggregated wireless network configuration information;

means for transmitting the modified wireless network configuration information from the centralized server to one or more mobile devices;

means for updating the wireless network configuration information stored locally in the one or more mobile devices using the modified wireless network configuration information received from the centralized server;

means for obtaining a list of wireless network signals available to a mobile device prior to connecting the mobile device to the remote connection test server through the available wireless network;

means for comparing the available wireless network signals against wireless network configuration information stored in the local configuration database;

means for updating stored wireless network configuration information with information obtained by the mobile device with respect to the available wireless network signals;

means for ranking the available wireless network signals based on the stored wireless network configuration information; and means for selecting an available wireless network signal having a desired ranking for the mobile device to utilize in establishing a connection to its corresponding wireless network.

21. A method for dynamic wireless network discovery comprising:

connecting a mobile device through an available wireless network to a remote connection test server;

updating wireless network configuration information stored in a configuration database local to the mobile device with information obtained from the connection to the connection test server;

transmitting the updated local wireless network configuration information to a centralized server database that aggregates wireless network configuration information received from a plurality of mobile devices;

limiting the updated local wireless network configuration information received from each mobile device for each wireless network to a desired geographic region;

determining whether wireless network configuration information has been previously stored at the centralized server for the wireless network and, if previously stored, updating the wireless network configuration information with the local wireless network configuration information received from each mobile device;

applying one or more business rules to the wireless network configuration information for the wireless network in order to characterize the wireless network and to generate the modified wireless network configuration information; and if the characterized wireless network meets predetermined configuration requirements, storing the generated modified wireless network configuration information for the wireless network at the centralized server for distribution to the one or more mobile devices.

* * * * *